(12) United States Patent
Brocke et al.

(10) Patent No.: US 11,163,420 B2
(45) Date of Patent: Nov. 2, 2021

(54) DATA PROCESSING APPARATUS AND METHOD FOR RENDERING A TREE STRUCTURE

(71) Applicant: THOMSON LICENSING, Issy les Moulineaux (FR)

(72) Inventors: Jens Brocke, Laatzen (DE); Frank Glaeser, Hannover (DE); Stefan Kubsch, Hohnhorst (DE); Hui Li, Hannover (DE); Michael Pieper, Hannover (DE); Michael Weber, Hannover (DE)

(73) Assignee: InterDigital Madison Patent Holdings, SAS, Paris (FR)

( * ) Notice: Subject to any disclaimer, the term of this patent is extended or adjusted under 35 U.S.C. 154(b) by 67 days.

(21) Appl. No.: 15/537,860

(22) PCT Filed: Nov. 27, 2015

(86) PCT No.: PCT/EP2015/077876
§ 371 (c)(1),
(2) Date: Jun. 19, 2017

(87) PCT Pub. No.: WO2016/096368
PCT Pub. Date: Jun. 23, 2016

(65) Prior Publication Data
US 2017/0371505 A1 Dec. 28, 2017

(30) Foreign Application Priority Data
Dec. 19, 2014 (EP) .................................. 14307100

(51) Int. Cl.
*G06F 3/048* (2013.01)
*G06F 3/0482* (2013.01)
(Continued)

(52) U.S. Cl.
CPC .......... *G06F 3/0482* (2013.01); *G06F 3/0487* (2013.01); *G06F 16/2246* (2019.01)

(58) Field of Classification Search
CPC .... G06F 3/0482; G06F 9/451; G06F 17/3053; G06F 17/30327; G06F 17/2241;
(Continued)

(56) References Cited

U.S. PATENT DOCUMENTS 5,664,133 A * 9/1997 Malamud .............. G06F 3/0482
345/902
5,701,137 A * 12/1997 Kiernan .................. G06F 9/451
715/853
(Continued)

FOREIGN PATENT DOCUMENTS

CN 101978346 A 2/2011
CN 102117333 A 7/2011
(Continued)

OTHER PUBLICATIONS

Mcguffin et al., "Expand-Ahead: A Space-Filling Strategy for Browsing Trees", 2004 IEEE Symposium on Information Visualization, Austin, Texas, USA, Oct. 10, 2004, pp. 1-8.
(Continued)

*Primary Examiner* — Linh K Pham
(74) *Attorney, Agent, or Firm* — Invention Mine LLC

(57) ABSTRACT

An apparatus (20) and method (10) for rendering a tree structure in a GUI depending on a position of a pointing cursor relative to the rendered tree use the cursor position with respect to the tree to control which tree branches to expand/collapse automatically. They reconfigure the tree view for compact presentation without need for explicit expand/collapse operations. A tree view is generated (11). A cursor position relative to the view is determined (14), consisting of first and second position values according to
(Continued)

first and second directions. The branch the cursor position is aligned with according to the first direction is automatically selected as active branch (15). Sub-levels of that branch to be expanded are determined (16), depending on the second position value relative to indentations of the sub-levels, and the tree view is automatically updated by expanding the determined sub-levels of the active branch and collapsing other branches (17).

20 Claims, 10 Drawing Sheets

(51) Int. Cl.
*G06F 16/22* (2019.01)
*G06F 3/0487* (2013.01)

(58) Field of Classification Search
CPC ........... G06F 17/30873; G06F 17/2247; G06F 17/30589; G06F 17/30598; G06F 16/9024; G06F 16/322; G06F 16/9027; G06F 16/2246
See application file for complete search history.

(56) References Cited

U.S. PATENT DOCUMENTS

| | | | |
|---|---|---|---|
| 6,061,060 A * | 5/2000 | Berry .................... | G06F 3/0481 715/781 |
| 6,380,957 B1 | 4/2002 | Banning | |
| 6,496,842 B1 | 12/2002 | Lyness | |
| 6,633,308 B1 | 10/2003 | Ono et al. | |
| 7,360,175 B2 | 4/2008 | Gardner et al. | |
| 7,536,410 B2 | 5/2009 | Wong et al. | |
| 7,634,723 B2 | 12/2009 | Layzell | |
| 7,908,550 B1 | 3/2011 | Chittu et al. | |
| 7,984,388 B2 | 7/2011 | Dieberger et al. | |
| 8,001,487 B2 | 8/2011 | Koppert et al. | |
| 8,214,842 B2 * | 7/2012 | Jaquet ................... | G06F 9/5016 715/739 |
| 2003/0080990 A1 | 5/2003 | Lyness | |
| 2005/0076312 A1* | 4/2005 | Gardner ................. | G06F 3/0482 715/853 |
| 2006/0156314 A1* | 7/2006 | Waldorf ................. | G06F 9/4484 719/328 |
| 2008/0141176 A1* | 6/2008 | Fukuoka ................ | G06F 3/0482 715/853 |
| 2009/0083675 A1 | 3/2009 | Gofer et al. | |
| 2009/0125845 A1* | 5/2009 | Lacock .................. | G06F 3/0482 715/841 |
| 2009/0158178 A1 | 6/2009 | Birsan et al. | |
| 2009/0187864 A1 | 7/2009 | Bedell et al. | |
| 2009/0228832 A1 | 9/2009 | Cheng | |
| 2009/0292718 A1 | 11/2009 | Cuneo et al. | |
| 2010/0310186 A1 | 12/2010 | Liu et al. | |

FOREIGN PATENT DOCUMENTS

| | | |
|---|---|---|
| CN | 102880395 A | 1/2013 |
| CN | 103793135 A | 5/2014 |
| JP | S63228218 A | 9/1988 |
| JP | H06337768 A | 12/1994 |
| JP | 2003501724 A | 1/2003 |
| JP | 2004005527 A | 1/2004 |
| JP | 2004295600 A | 10/2004 |
| JP | 2007507797 A | 3/2007 |
| JP | 2008097488 A | 4/2008 |
| JP | 2009259163 A | 11/2009 |
| JP | 2011524047 A | 8/2011 |
| RU | 2502215 C2 | 12/2013 |

OTHER PUBLICATIONS

Song et al., "LensTree: Browsing and Navigation Large Hierarchical Information Structures", 16th International Conference on Artificial Reality and Telexistence, Hangzhou, China, Nov. 29, 2006, pp. 1-6.

\* cited by examiner

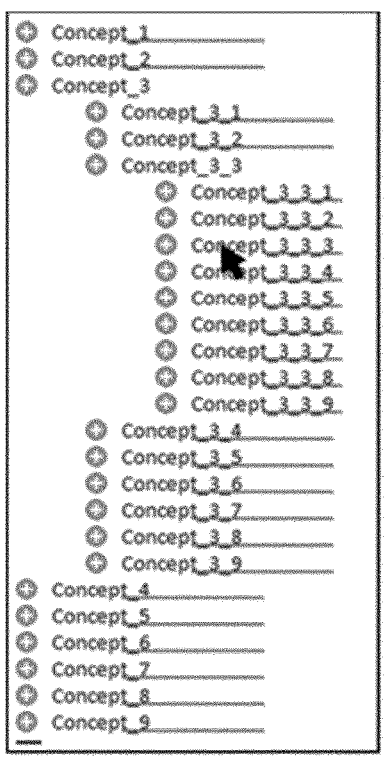
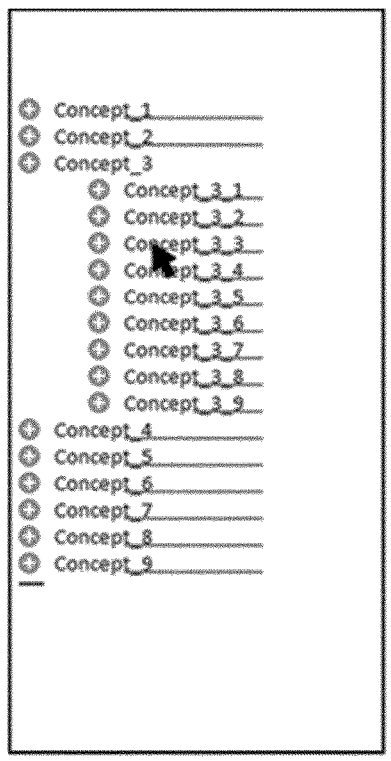
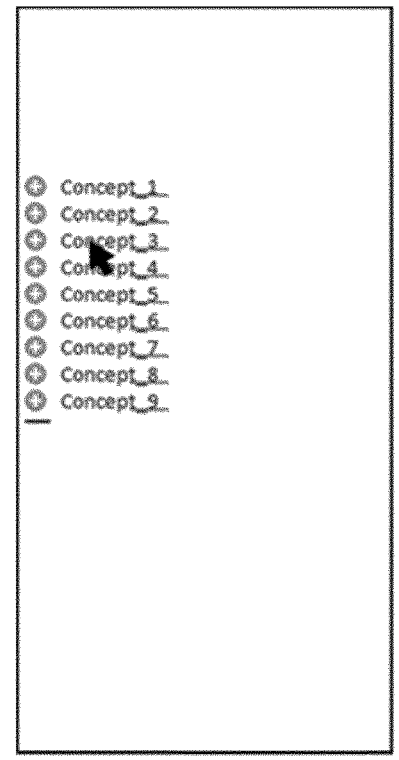
Fig. 12               Fig. 13               Fig. 14
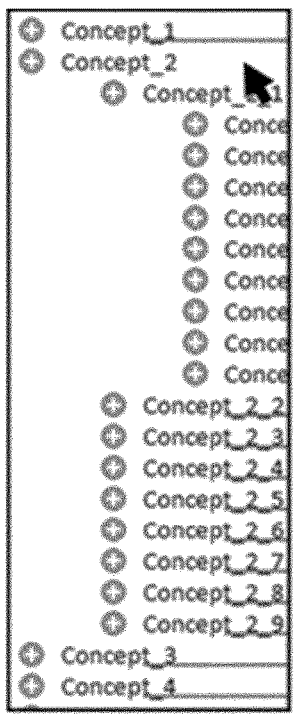
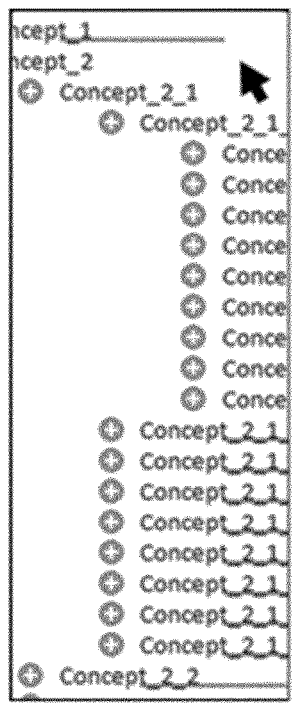
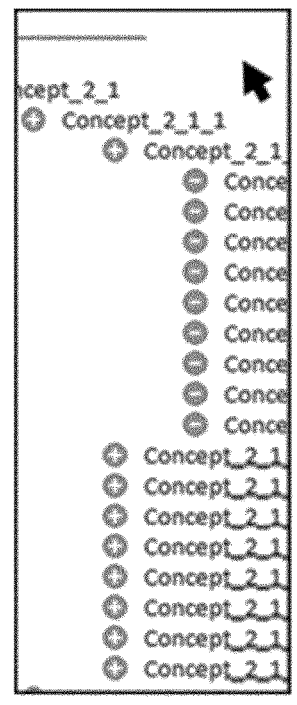
Fig. 15               Fig. 16               Fig. 17

DATA PROCESSING APPARATUS AND METHOD FOR RENDERING A TREE STRUCTURE

This application claims the benefit, under 35 U.S.C. § 365 of International Application PCT/EP2015/077876, filed 27 Nov. 2015, which was published in accordance with PCT Article 21(2) on 23 Jun. 2016, in English, and which claims the benefit of European Patent Application No. 14307100.9 filed on 19 Dec. 2014.

FIELD

A data processing apparatus and a computer implemented method for rendering a tree structure of elements are presented. In particular, the present disclosure relates to a data processing apparatus and a computer implemented method for rendering a tree structure of elements in a graphical user interface depending on a position of a pointing cursor relative to the rendered tree structure, and to a corresponding computer readable storage medium.

BACKGROUND

Concepts used, e.g., for semantic metadata annotation of multimedia data are often arranged according to a hierarchical super-concept/sub-concept scheme, resulting in concept taxonomies. For example, a vehicle taxonomy may comprise the sub-concepts ground vehicle, watercraft, aircraft, etc., with the ground vehicles further comprising sub-concepts like car, truck, bus, etc. In taxonomies, any sub-concept is a kind of all of its super-concepts. Therefore, if a specific concept to be annotated is missing in a taxonomy, an annotator can fall back to the best matching super-concept. For example, a battle tank may be annotated as ground vehicle, and a UFO (unidentified flying object) may be annotated as vehicle.

A large and complex taxonomy can have several independent top-level concepts, lots of levels of hierarchy beneath each top-level concept, and many sub-concepts of single super-concepts. This huge amount of deeply nested concepts can be difficult to render conveniently in a graphical user interface (GUI) of an application using this taxonomy, e.g. in a view showing this taxonomy for selection of concepts to be annotated.

One possibility to render taxonomies is to employ a table view. Here, each top-level concept may get its own table or be the header of a table column or row. For example, a column header shows a super-concept and the content of the column the corresponding sub-concepts. If further granularity is desired, columns may contain sub-tables, e.g. with a direct sub-concept shown in bold face and its lower-level concepts shown in normal face. Such a table view can show many concepts and their hierarchy in small space and can provide a good overview of the concepts. However, it can only show a few levels of hierarchy at a time without getting confusing. If a user needs to review further sub-levels, the user must select a concept for which further sub-levels are to be shown, e.g. by updating a currently shown table or showing an additional table. In a deeply nested taxonomy, multiple such selections may be necessary to reach a specific concept. If no concept of interest is found, the user may want to revert back to a table showing higher-level concepts again. This switching between a coarser and finer grained view of a taxonomy is similar to drill down/up operations on rendering and processing of multi-dimensional data in online analytical processing (OLAP) of databases and pivot tables.

Another possibility to render taxonomies is to employ a tree view. Such views are used to show deeply nested hierarchies in various applications, e.g. file system explorers or document outlining tools. Such applications may provide controls to extend/reduce a currently shown number of tree levels beneath a selected one by one or more levels, expand/collapse all tree levels beneath a selected one, collapse a specifically configured sub-tree to a selected level and afterwards show this sub-tree as previously configured again, show a specific number of tree levels beneath the top level, etc. A tree view with such functionality can also be used to render taxonomies so that a user can browse and expand the sub-trees of interest to find and select a concept of interest. Such a tree view can render huge taxonomies with many levels of hierarchy. However, it is less suitable for providing an overview of the concepts: If many tree levels are expanded, much scrolling is needed to find a concept in the spread-out view, and it is hard to keep track of concept relationships. If, for a more compact view, only few tree levels are expanded, many expand/collapse operations are needed to drill down to or up from low-level concepts.

For small taxonomies a GUI of an application using taxonomies may contain table views, but a table view can hardly handle a high number of hierarchy levels of a large taxonomy properly, causing a need for frequent updating of the table view or showing of child tables quickly. On the other hand, in some applications a manually configurable tree view is used for large taxonomies, but this lacks convenience due to the compact overview vs. required amount of view reconfiguration operations issue. The same problem applies not only to searching for concepts in a taxonomy, but also for elements in other complex tree views, e.g. to searching for a file in a deeply nested file directory structure or for a database entry in a deeply nested database structure.

There remains a need to solve the convenience problems of a manually configured tree view, e.g., for rendering of large taxonomies, and provide a more efficient man-machine-interface that allows an improved finding and selecting of an element, i.e. a node, in a tree structure of elements displayed in a tree view, e.g. concepts in a taxonomy displayed in a tree view.

SUMMARY OF THE INVENTION

A computer implemented method and a data processing apparatus for rendering a tree structure of elements in a graphical user interface (GUI) depending on a position of a pointing cursor relative to the rendered tree structure, as well as a computer readable storage medium, according to the appended claims are suggested.

According to an embodiment, a computer implemented method for rendering a tree structure of elements in a graphical user interface depending on a position of a pointing cursor relative to the rendered tree structure comprises
  generating a tree view of the tree structure being organized in a plurality of branches;
  determining the position of the pointing cursor relative to the tree view, the position consisting of a first position value according to a first direction and a second position value according to a second direction orthogonal to the first direction;

automatically selecting the branch the position of the pointing cursor is aligned with according to the first direction as an active branch;

determining sub-levels of the active branch to be expanded, depending on the second position value relative to indentations of the sub-levels; and automatically updating the tree view by expanding the determined sub-levels of the active branch and collapsing other branches.

Accordingly, a data processing apparatus for rendering a tree structure of elements in a graphical user interface depending on a position of a pointing cursor relative to the rendered tree structure comprises a graphical representation unit configured to generate a tree view of the tree structure being organized in a plurality of branches;

a position determination unit configured to determine the position of the pointing cursor relative to the tree view, the position consisting of a first position value according to a first direction and a second position value according to a second direction orthogonal to the first direction;

an active branch selection unit configured to automatically select the branch the position of the pointing cursor is aligned with according to the first direction as an active branch; and an expansion determination unit configured to determine sub-levels of the active branch to be expanded, depending on the second position value relative to indentations of the sub-levels;

the graphical representation unit being further configured to automatically update the tree view by expanding the determined sub-levels of the active branch and collapsing other branches.

Units comprised in the apparatus, such as the graphical representation unit, the position determination unit, the active branch selection unit and the expansion determination unit may be provided as separate devices, jointly as at least one device or logic circuitry, or functionality carried out by a microprocessor, microcontroller or other processing device, computer or other programmable apparatus.

According to an embodiment, a data processing apparatus for rendering a tree structure of elements in a graphical user interface depending on a position of a pointing cursor relative to the rendered tree structure comprises a processing device;

a display device; and a memory device storing instructions that, when executed, cause the processing device to generate a tree view showing, using the display device, the tree structure being organized in a plurality of branches;

determine the position of the pointing cursor relative to the tree view, the position consisting of a first position value according to a first direction and a second position value according to a second direction orthogonal to the first direction;

automatically select the branch the position of the pointing cursor is aligned with according to the first direction as an active branch;

determine sub-levels of the active branch to be expanded, depending on the second position value relative to indentations of the sub-levels; and automatically update the tree view shown by the display device by expanding the determined sub-levels of the active branch and collapsing other branches. The devices are connected by a bus or other communication lines.

Further, a computer readable storage medium has stored therein instructions enabling rendering a tree structure of elements in a graphical user interface depending on a position of a pointing cursor relative to the rendered tree structure, which, when executed by a computer, cause the computer to:

generate a tree view of the tree structure being organized in a plurality of branches;

determine the position of the pointing cursor relative to the tree view, the position consisting of a first position value according to a first direction and a second position value according to a second direction orthogonal to the first direction;

automatically select the branch the position of the pointing cursor is aligned with according to the first direction as an active branch;

determine sub-levels of the active branch to be expanded, depending on the second position value relative to indentations of the sub-levels; and automatically update the tree view by expanding the determined sub-levels of the active branch and collapsing other branches.

The computer readable storage medium tangibly embodies a program of instructions, which, when executed by a computer, cause the computer to perform the described method steps.

The graphical user interface is responsive to user input controlling the position of the pointing cursor relative to the rendered tree structure of elements. The pointing cursor can be moved or manipulated using a pointing cursor manipulation device, for example a computer mouse, trackball, trackpoint or touchpad. If the display device is a touchscreen device, the pointing cursor can also be moved or manipulated using, e.g., a finger of the user or a stylus. In an embodiment the pointing cursor can be moved in response to hand or finger tracking and gesture recognition during analysis of a live video provided by a camera showing the user.

The tree structure is organized in, i.e. comprises, a plurality of branches or paths of connected nodes, which may consist of sub-levels, i.e. tree-levels beneath a parent node, wherein the elements or nodes contained in a sub-level are connected to a same indentation as siblings of a same parent node.

The tree view is a graphical representation of the tree structure. The tree view is shown in a GUI element, e.g. a window or frame. It allows automatic selection of the active branch, i.e. the position of the pointing cursor is determined without clicking, just by evaluating the position of the pointing cursor relative to the tree view. The active branch is the branch which is selected to be explored by the user, e.g. by expanding sub-levels. This relative position of the pointing cursor can be changed, either by moving the pointing cursor over the tree view or by scrolling the viewing window showing the tree view, while the absolute position of the pointing cursor, i.e. the position in relation to the borders of the viewing window or the screen of the display device displaying the viewing window containing the tree view, may or may not remain unchanged.

Then it is calculated, how many sub-levels of the active branch to expand, depending on an evaluation of offsets of the second position value relative to indentations of the sub-levels. Afterwards, without manual interaction by the user, an automatic tree view reconfiguration mechanism causes the automatic updating of the tree view by expanding the determined sub-levels of the active branch and collapsing the other branches.

The automatic tree view reconfiguration mechanism according to the proposed solution allows to quickly examine a complex tree like data structure. It mimics the behavior of a user using manual controls to browse nested data, e.g. of a taxonomy, a file system or a database, being organized in a tree structure and displayed as tree in a tree view, to find and select an element of interest, i.e. a concept, a file or a database entry, respectively, starting at the top-level elements, then drilling down into one branch of the tree at one time only, and possibly drilling up again if no element of interest is found, including collapsing of the sub-levels being left. The mechanism uses the position of a pointing cursor with respect to the tree view to control which branches of the tree to expand/collapse automatically. It reconfigures the tree view for a compact presentation of the tree without the need for explicit expand/collapse operations by mouse clicks, keystrokes, touchscreen taps, or similar, and needing less pointing cursor movements than necessary for a corresponding manual control scheme.

The mechanism according to the proposed solution at least has the effect that a user can perform the task of finding/selecting an element of interest in a faster and more convenient way than by using manual controls, i.e., a more efficient man-machine interface is provided.

In one embodiment the first direction corresponds to a vertical direction and the second direction corresponds to a horizontal direction on a screen of a display device displaying the tree view in the graphical user interface. Here, the vertical position of the pointing cursor with respect to the tree elements is used to control which branch of the tree is selected as the active branch that may be expanded, and the horizontal position of the pointing cursor with respect to the indentations of the tree levels is used to control how many sub-levels of the active branch will be expanded. A sub-level of the active branch is determined as to be expanded, if the indentation of the sub-level is found left of the position of the pointing cursor. In a different embodiment the first direction corresponds to the horizontal direction and the second direction corresponds to the vertical direction.

In one embodiment the determining of the position of the pointing cursor, the automatic selecting of the active branch, the determining of sub-levels to be expanded and the automatic updating of the tree view are continuously repeated. The automatic mechanism constantly tracks any movement of the pointing cursor and, if necessary, immediately automatically reconfigures the tree view for a compact presentation of the tree. In an embodiment a short delay can be introduced before automatically performing the expand/collapse operations. In another embodiment the expand and/or collapse operations are delayed until an additional keystroke, e.g. of an arrow key, has been performed.

In one embodiment the tree view is updated by collapsing an exceeding sub-level of the active branch and the updated tree view is moved, automatically without further user interaction, in the first direction until a corresponding element hiding, i.e. comprising, the collapsed exceeding sub-level becomes aligned with the position of the pointing cursor according to the first direction, if an amount of the sub-levels to be expanded is less than an amount of currently expanded sub-levels. In other words, if the displayed position of the pointing cursor becomes inconsistent with the automatically reconfigured tree view due to expand/collapse operations, the updated tree view is automatically moved in the first direction, e.g. vertically, so that the actual pointing cursor position reflects the new logical pointing cursor position with respect to the updated tree view. If the first direction is the vertical direction and the pointing cursor is not vertically aligned with a direct or indirect super-element of the tree level being collapsed due to moving the pointing cursor to the left, simply collapsing this tree level otherwise may cause an arbitrary tree element, if any at all, to be vertically aligned with the pointing cursor, depending on the space previously occupied by the elements of this tree level and the vertical position of the pointing cursor with respect to these elements. This could result in no more active branch or a new active branch to be automatically selected, comprising this arbitrary tree element. On the other hand, moving the tree view according to the embodiment keeps the branch comprising the super-element the active branch and enables seamless further navigation through the tree. In some cases, such automatic reconfigurations or a manual vertical scrolling of the viewing window containing the tree view may cause the topmost element of the tree to be displayed with some distance from the top edge of the viewing window. In one embodiment, therefore, the tree view together with the displayed pointing cursor is shifted towards said edge by said distance.

In one embodiment the tree structure of elements corresponds to a taxonomy, i.e. a classification scheme of concepts, e.g. concepts from taxonomies used for multimedia data. Here, the graphical user interface with the interactive tree view corresponds to a taxonomy browser for hierarchical metadata, i.e. a taxonomy is rendered in the GUI, e.g. for semantic metadata annotation to multimedia data. The automatic tree view reconfiguration mechanism adapted to the task of finding and selecting a concept in a taxonomy displayed as tree in a tree view according to the proposed solution allows efficient rendering of even large taxonomies.

In another embodiment the tree structure of elements corresponds to a directory structure of files. In general, the automatic tree view reconfiguration mechanism according to the proposed solution can also be used for tree views showing other content than taxonomies in various applications if the intended use of these views is to quickly browse to and select an element of the tree. For example, any database, document outlining tool, file explorer or an "Open File" dialog containing a tree view using the proposed tree view reconfiguration mechanism may need fewer control operations to find and select an element compared to applications using a standard tree view needing explicit operations to expand/collapse sub-trees, e.g. subfolders.

In one embodiment the computer implemented method comprises
  selecting between an automatic mode and a manual mode in response to a mode selection input by a user; wherein
  the determining of the position of the pointing cursor, the automatic selecting of the active branch, the determining of sub-levels to be expanded and the automatic updating of the tree view are executed only in the automatic mode, and wherein
  the tree view is updated in response to further manual user input to the graphical user interface in the manual mode.

An apparatus carrying out the method according to the proposed solution can provide both manual tree view configuration functionalities and the proposed automatic mechanism, with a means to switch between the two modes. In an embodiment, it stores the manually established view configuration when the automatic mode is switched on and restores the previously stored configuration when the automatic mode is switched off again.

In one embodiment the pointing cursor is generated specifically for user interaction with the tree view. This applies, e.g., to systems not using a standard pointing cursor. For devices which use, e.g., a mouse pointer as their standard input, scrolling solutions not dependent on scroll bars can be provided, whereas touchscreen-controlled devices not using such a standard pointing cursor can use the standard swiping gestures for scrolling. On systems using a pointing cursor controlled by a pointing input device, e.g. a mouse, trackball, touchpad, or trackpoint, the pointing cursor position is defined by the position of this pointing cursor. On systems not using such a standard pointing cursor, e.g. touchscreen-controlled devices, a pointing cursor specifically dedicated to the viewing window of the tree view is used instead. The position of this dedicated pointing cursor is controlled by dragging the pointing cursor over the viewing window, e.g. by a user's finger or a stylus. In particular, on systems using a standard pointing cursor and when the automatic mechanism according to the proposed solution is active, an application using this automatic mechanism does not use standard scroll bars at the edges of the viewing window to scroll the view, because moving the pointing cursor across the tree view to access such scroll bars may cause reconfigurations of the view. Instead, other scroll control means are used, e.g. keyboard controls, the mouse wheel (e.g. vertical scrolling using the wheel as usual, and horizontal scrolling by pressing the wheel, in combination with mouse movements, or left/right tilting of the wheel if supported), or automatic scrolling when the pointing cursor is moved to the edges of the viewing window. On the other hand, a touchscreen-controlled application can use standard swiping gestures on the viewing window to scroll the view, provided that a swiping gesture does not start at the pointing cursor position, which could be interpreted as dragging the pointing cursor instead.

In one embodiment the tree view comprises visual indications whether or not a tree element corresponds to an indentation and has sub-elements, i.e. hides a sub-tree. The visual indications can be icons, such as a plus, a right-pointing triangle or an arrow. As another example, the visual indications can be given by rendering tree elements in different styles, e.g. different color or typeface, bold/italic or not, etc. In an embodiment, the visual indications additionally comprise a graphical suggestion of the complexity of the not-yet-expanded levels or sub-trees, such as a number or a bar indicating an amount of hidden elements.

Further, in one embodiment one or more position indicators visualizing a position of a visible section of the tree structure with respect to the tree view are shown as part of the viewing window. This provides navigation information, for example when scrolling the view or automatic reconfiguration of the view has led to no part of the tree view actually being visible within the viewing window. Position indicators can be, for example, scroll bars, small lines with a broader part indicating the position, and/or plain lines indicating the position with respect to the height/width of the viewing window. If the position indicators provide scroll control functionality, they are not used for scrolling the viewing window to avoid potentially undesired reconfiguration of the tree view on moving the pointing cursor across the view. In another embodiment the position indicators are shown in a separate window or frame of the graphical user interface.

While not explicitly described, the present embodiments may be employed in any combination or sub-combination.

BRIEF DESCRIPTION OF THE DRAWINGS

FIGS. 4-32 schematically illustrate an embodiment of a tree view being subject to the tree view reconfiguration mechanism during user interaction via a pointing cursor. In particular, FIG. 4 illustrates an example tree view;

FIG. 5 illustrates a situation where the pointing cursor is outside of the viewing window of the tree view;

FIG. 6 illustrates a situation where the pointing cursor is not vertically aligned with a tree element;

FIG. 7 illustrates a situation where an active branch with only the top-level element is displayed;

FIG. 8 illustrates a situation where a next sub-level of an active branch is automatically expanded;

FIG. 9 illustrates a situation where further sub-levels of the active branch are automatically expanded;

FIG. 10 illustrates a situation where an active branch is selected via a sub-level tree element;

FIG. 11 illustrates a situation where a next sub-level beneath the sub-level tree element is automatically expanded;

FIG. 12 illustrates a first part of a situation where tree levels are automatically collapsed;

FIG. 13 illustrates a second part of a situation where tree levels are automatically collapsed;

FIG. 14 illustrates a third part of a situation where tree levels are automatically collapsed;

FIG. 15 illustrates a first part of a situation where sub-levels are automatically expanded by scrolling;

FIG. 16 illustrates a second part of a situation where sub-levels are automatically expanded by scrolling;

FIG. 17 illustrates a third part of a situation where sub-levels are automatically expanded by scrolling;

FIG. 18 illustrates a first part of a situation where sub-levels are automatically collapsed by scrolling;

FIG. 19 illustrates a second part of a situation where sub-levels are automatically collapsed by scrolling;

FIG. 20 illustrates a third part of a situation where sub-levels are automatically collapsed by scrolling;

FIG. 21 illustrates a first part of a situation where the topmost branch is automatically expanded;

FIG. 22 illustrates a second part of a situation where the topmost branch is automatically expanded;

FIG. 23 illustrates a first part of a situation where the bottommost branch is automatically expanded;

FIG. 24 illustrates a second part of a situation where the bottommost branch is automatically expanded;

FIG. 25 illustrates a first part of a situation of automatic collapsing/expanding on change of the active branch;

FIG. 26 illustrates a second part of a situation of automatic collapsing/expanding on change of the active branch;

FIG. 27 illustrates a first part of a situation of automatic expanding of a branch at the top by scrolling;

FIG. 28 illustrates a second part of a situation of automatic expanding of a branch at the top by scrolling;

FIG. 29 illustrates a first part of a situation of automatic expanding of a branch at the bottom by scrolling;

FIG. 30 illustrates a second part of a situation of automatic expanding of a branch at the bottom by scrolling;

FIG. 31 illustrates a first part of a situation of automatic collapsing/expanding on change of the active branch by scrolling; and FIG. 32 illustrates a second part of a situation of automatic collapsing/expanding on change of the active branch by scrolling.

DETAILED DESCRIPTION OF EMBODIMENTS

For a better understanding, the proposed solution will now be explained in more detail in the following description with reference to the drawings. It is understood that the solution is not limited to these exemplary embodiments and that specified features can also expediently be combined and/or modified without departing from the scope of the present invention as defined in the appended claims.

Figure 1:
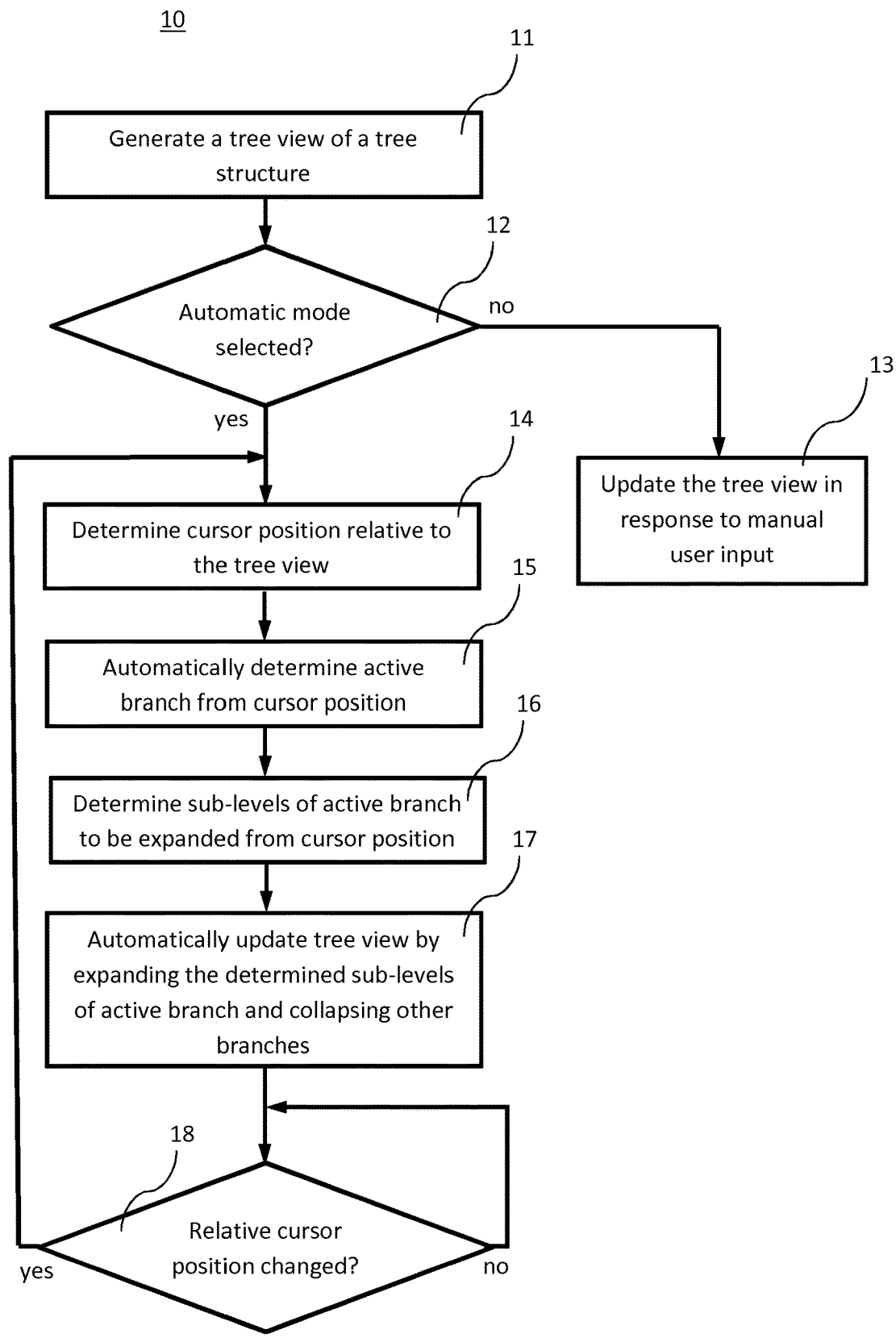
FIG. 1 schematically illustrates an embodiment of a method for rendering a tree structure of elements in a graphical user interface depending on a position of a pointing cursor relative to the rendered tree structure.

Referring to FIG. 1, an embodiment of a computer implemented method 10 for rendering a tree structure of elements in a graphical user interface depending on a position of a pointing cursor relative to the rendered tree structure is schematically shown. According to the shown embodiment, the method provides an automatic mechanism that constantly reconfigures the tree view for a compact presentation of the tree.

In a first step 11 a tree view of the tree structure, which is organized in a plurality of branches, is generated. According to the shown embodiment, in a next step 12 a selection between an automatic mode and a manual mode is performed in response to a mode selection input by the user. In the manual mode the tree view is updated in a next step 13 in response to further manual user input to the graphical user interface.

In the automatic mode the following steps are performed:

In a next step 14 the position of the pointing cursor relative to the tree view is determined. The position consists of a first position value according to a first direction and a second position value according to a second direction orthogonal to the first direction.

In a next step 15 the branch the position of the pointing cursor is aligned with according to the first direction is automatically selected as an active branch. In a next step 16 sub-levels of the active branch to be expanded are determined depending on the second position value relative to indentations of the sub-levels. In a next step 17 the tree view is automatically updated by expanding the determined sub-levels of the active branch and collapsing the other branches.

If the position of the pointing cursor relative to the tree view is continued to be changed in a next step 18, the pointing cursor position determination step 14, the active branch selection step 15, the sub-level expansion determination step 16 and the automatic tree update step 17 are continuously repeated. Otherwise, in the shown embodiment the method waits for any more position change of the pointing cursor relative to the tree view.

Figure 2:
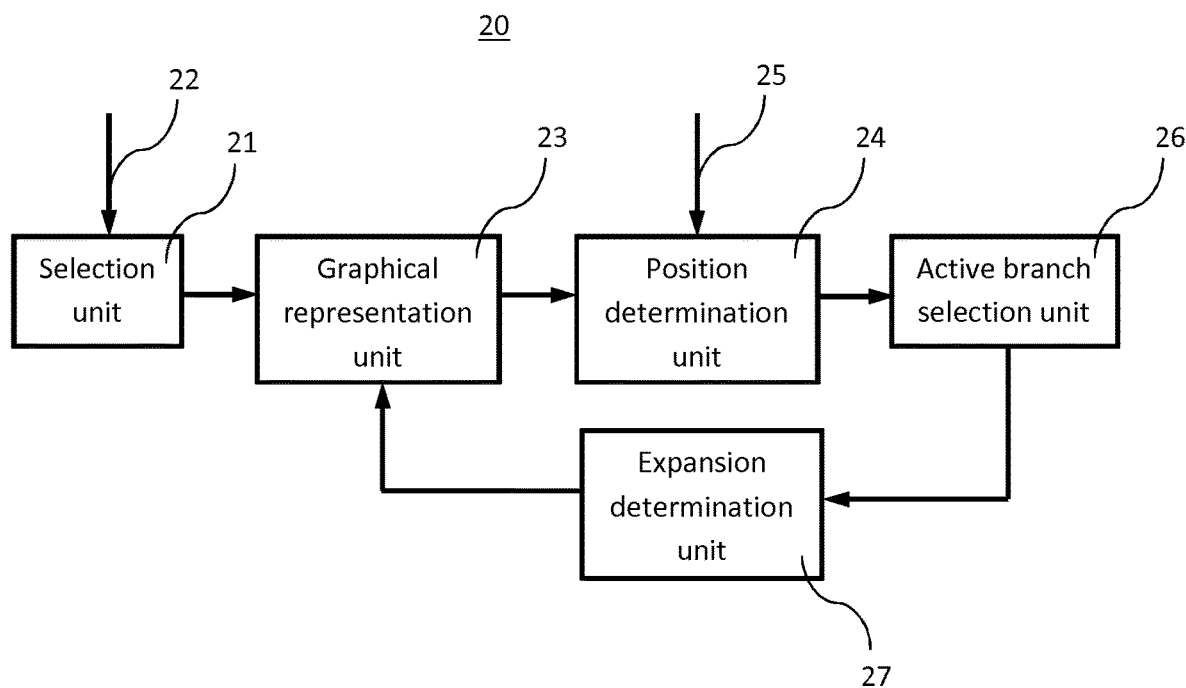
FIG. 2 schematically illustrates an embodiment of a data processing apparatus for rendering a tree structure of elements in a graphical user interface depending on a position of a pointing cursor relative to the rendered tree structure.
Figure 3:
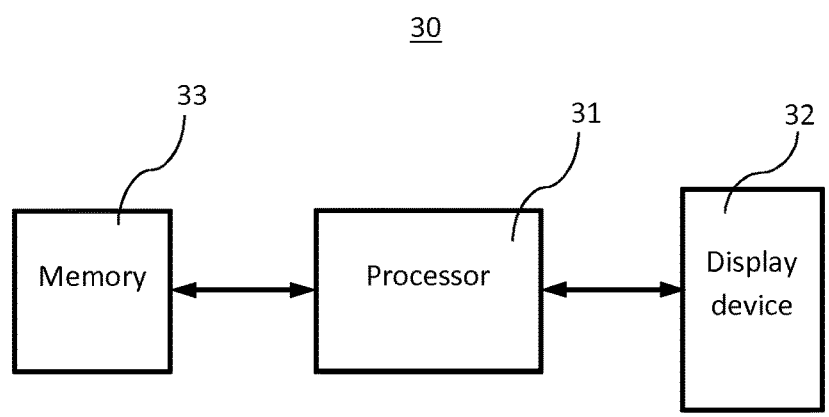
FIG. 3 schematically illustrates another embodiment of a data processing apparatus for rendering a tree structure of elements in a graphical user interface depending on a position of a pointing cursor relative to the rendered tree structure.

Referring now to FIG. 2 and FIG. 3, embodiments of data processing apparatuses for rendering a tree structure of elements in a graphical user interface depending on a position of a pointing cursor relative to the rendered tree structure are schematically shown. The apparatus shown in FIG. 2 and the apparatus shown in FIG. 3 allow implementing the advantages and characteristics of the described method for rendering a tree structure as part of an apparatus for rendering a tree structure of elements in a graphical user interface depending on a position of a pointing cursor relative to the rendered tree structure.

The data processing apparatus 20 shown in FIG. 2 comprises a selection unit 21 configured to select between an automatic mode and a manual mode in response to a mode selection input 22 by the user.

A graphical representation unit 23 is configured to generate a tree view of the tree structure being organized in a plurality of branches. The graphical representation unit 23 is connected to or connectable to or comprises a display device for displaying the tree view. In the manual mode the graphical representation unit 23 updates the tree view in response to further manual user input to the graphical user interface. In the automatic mode the graphical representation unit 23 updates the tree view in response to input from at least an expansion determination unit 27.

A position determination unit 24 is connected to the graphical representation unit 23 and is configured to determine a position of the pointing cursor relative to the tree view. The position consists of a first position value according to a first direction and a second position value according to a second direction orthogonal to the first direction. The position is determined based on input 25 from the user controlling the position of the pointing cursor by scrolling or moving the pointing cursor.

An active branch selection unit 26 is configured to automatically select the branch the position of the pointing cursor is aligned with according to the first direction as an active branch, and an expansion determination unit 27 is configured to determine sub-levels of the active branch to be expanded, depending on the second position value relative to indentations of the sub-levels.

The graphical representation unit 23 is configured to automatically update the tree view by expanding the determined sub-levels of the active branch and collapsing the other branches.

In the embodiment shown in FIG. 2 the selection unit 21, the graphical representation unit 23, the position determination unit 24, the active branch selection unit 26 and the expansion determination unit 27 directly communicate with each other. In another embodiment the apparatus comprises a controller unit connected to one or more of the units and controls their communication.

The selection unit 21, the graphical representation unit 23, the position determination unit 24, the active branch selection unit 26 and the expansion determination unit 27 may be provided as separate devices, jointly as at least one device or logic circuitry, or functionality carried out by a microprocessor, microcontroller or other processing device, computer or other programmable apparatus arranged to perform the processing, connected to or comprising at least one memory device.

As shown in FIG. 3, an embodiment of a data processing apparatus 30 for rendering a tree structure of elements in a graphical user interface depending on a position of a pointing cursor relative to the rendered tree structure comprises a processing device 31, a display device 32 and a memory device 33 storing instructions that, when executed, cause the processing device to generate a tree view showing, using the display device 32, the tree structure being organized in a plurality of branches;

determine the position of the pointing cursor relative to the tree view, the position consisting of a first position value according to a first direction and a second position value according to a second direction orthogonal to the first direction;

automatically select the branch the position of the pointing cursor is aligned with according to the first direction as an active branch;

determine sub-levels of the active branch to be expanded, depending on the second position value relative to indentations of the sub-levels; and automatically update the tree view shown by the display device by expanding the determined sub-levels of the active branch and collapsing other branches.

For example, the processing device can be a processor adapted to perform the steps according to one of the described methods. In an embodiment said adaptation comprises that the processor is configured, for example programmed, to perform steps according to one of the described methods.

Referring now to FIGS. 4 to 32, as an example, an embodiment of a taxonomy tree view being subject to the automatic tree view reconfiguration mechanism during user interaction via a pointing cursor in the automatic mode is schematically illustrated.

Figure 4:
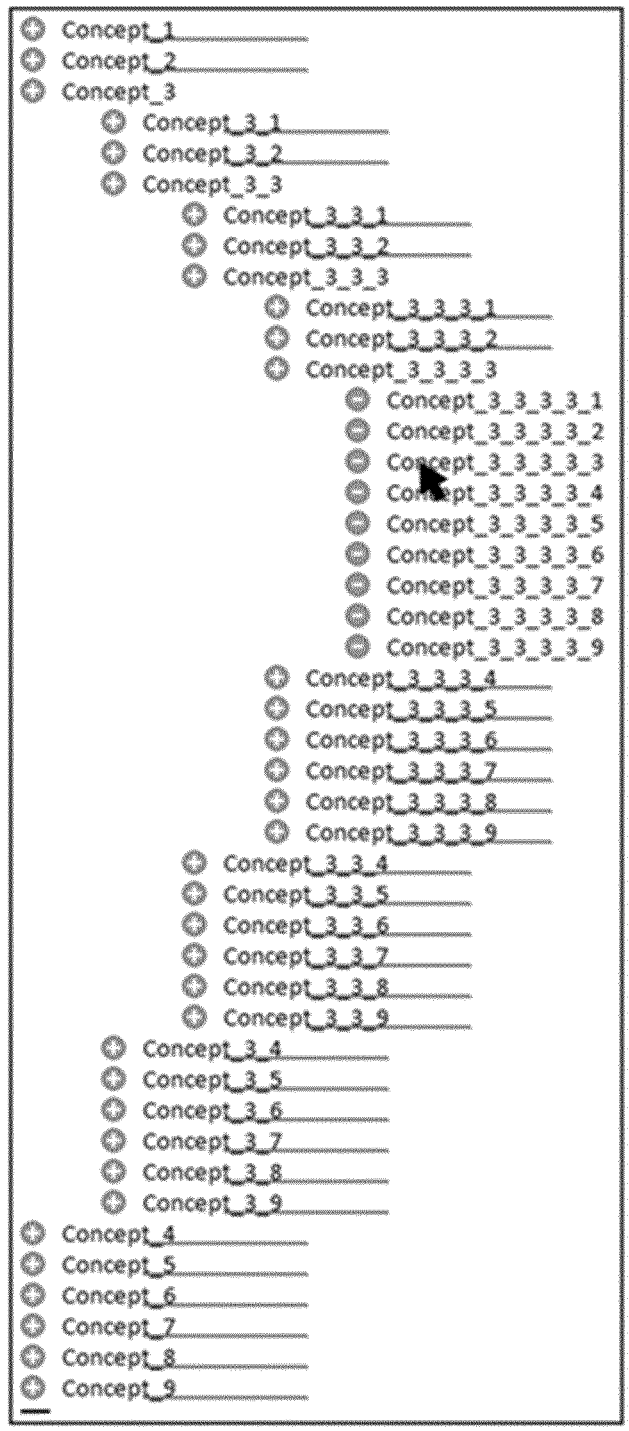

FIG. 4 shows an example of a tree view of a taxonomy tree in a viewing window, currently having four sub-levels expanded. The position of the pointing cursor is indicated by an arrow. The taxonomy displayed as tree in the tree view has 9 top-level concepts (Concept_1, ..., Concept_9) with each super-concept or parent node/element having 9 sub-concepts or child nodes/elements, with 5 levels of hierarchy in total. In the example illustrated in FIGS. 4 to 32, this taxonomy is manipulated. In FIG. 4 only the branch the pointing cursor is vertically aligned with is expanded while the other branches are collapsed, providing a compact presentation of the tree although tree elements up to level 5 are visible. According to the proposed solution, the position of the pointing cursor with respect to the tree view is used for controlling the automatic expand/collapse operations of the tree view. The vertical position of the pointing cursor with respect to the tree elements controls which branch of the tree may be expanded as the active branch. The other branches of the tree are collapsed automatically. These are called the inactive branches. The horizontal position of the pointing cursor with respect to the indentation of the tree levels controls how many sub-levels of the active branch may be expanded. On automatic expanding/collapsing of tree elements, the updated tree view may also automatically be moved vertically so that the actual pointing cursor position reflects the new logical pointing cursor position with respect to the updated tree view.

Figure 5:
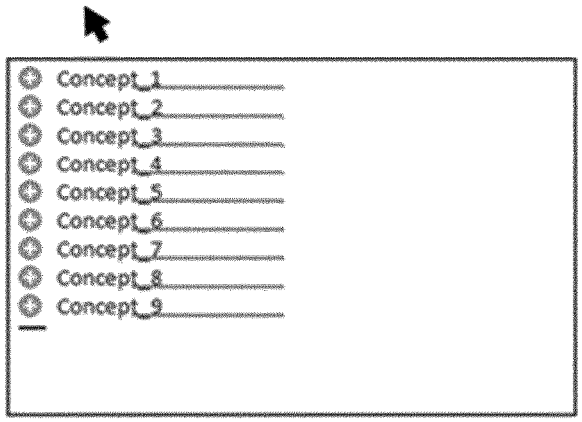

FIG. 5 shows the tree view when the pointing cursor does not point to the viewing window. The situation is only possible if the pointing cursor is the system's pointing cursor, i.e. a standard pointing cursor not specifically created for interacting with the tree view. In this case, there is no active branch by definition, regardless of the vertical position of the pointing cursor. Therefore, only the top-level elements of the tree are displayed. Furthermore, in the shown embodiment the tree is always displayed with its topmost element at the top left corner of the viewing window, including associated sub-element indicators if applied to the top-level tree elements. This provides the user with a compact and consistent presentation of the tree as starting point for navigation through the tree when the pointing cursor is moved into the viewing window. Such movements may already cause an automatic reconfiguration of the tree view, depending on the position at which the pointing cursor enters the viewing window with respect to the tree view and the direction of the movement.

Figure 6:
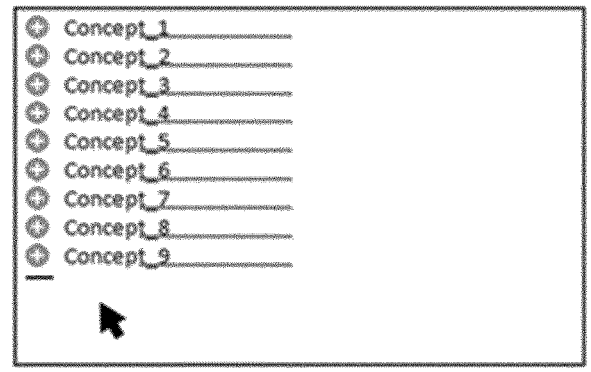
Figure 7:
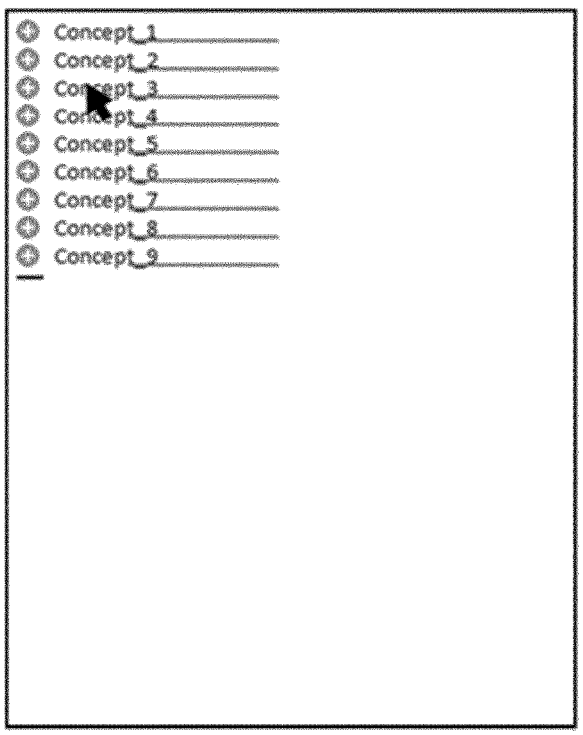
Figure 8:
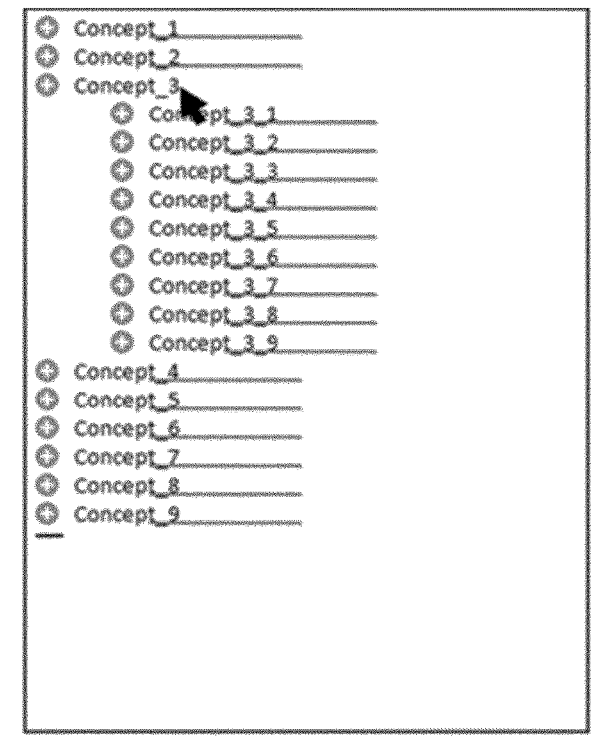
Figure 9:
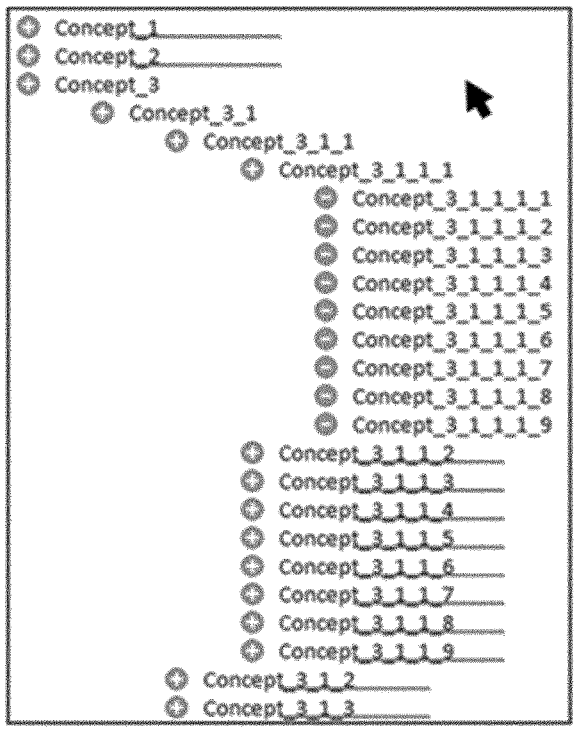
Figure 10:
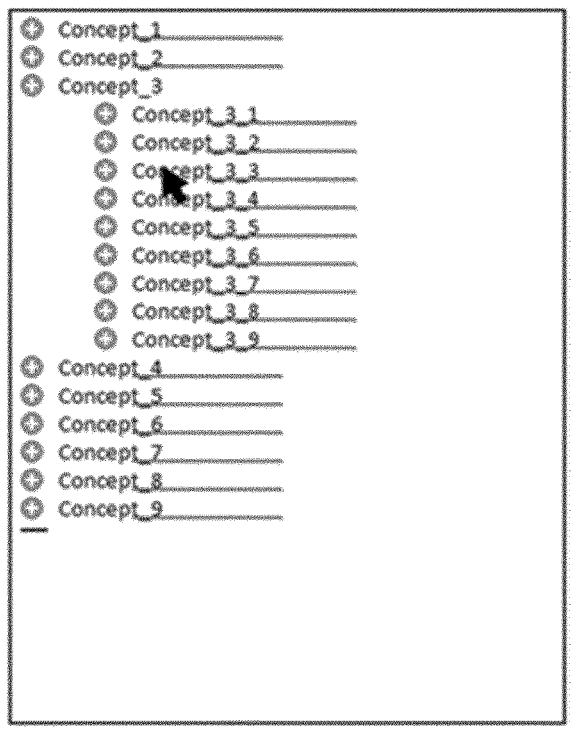
Figure 11:
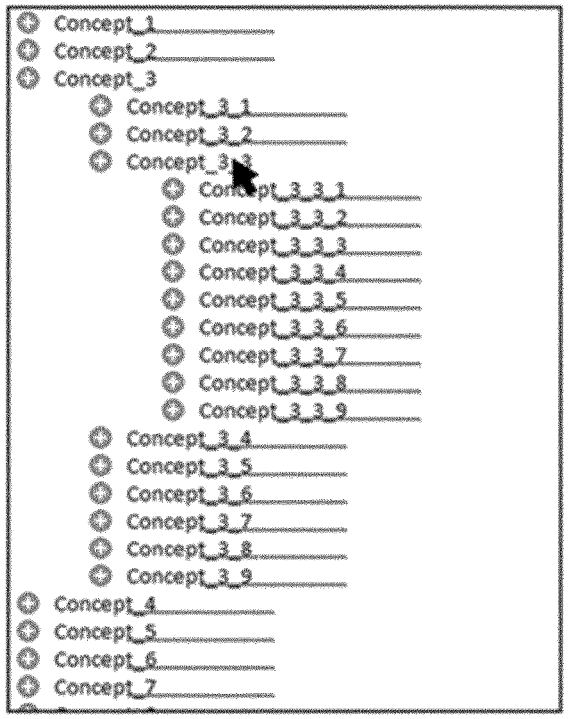

FIG. 6 illustrates a situation when the pointing cursor points to the viewing window but is not vertically aligned with any tree element. No branch is selected as the active branch, resulting in only the top-level elements of the tree being displayed, too. Therefore, when the system's pointing cursor is moved into the viewing window without the entering position being vertically aligned with any tree element, the tree view does not change. However, due to the topmost tree element being displayed at the top edge of the viewing window when the pointing cursor does not point to the viewing window, moving the pointing cursor into the viewing window from the top causes the entering position to be vertically aligned with the topmost tree element, unless there is no tree to be displayed at all. When the pointing cursor points to the viewing window and is vertically aligned with a tree element, the branch this element belongs to is the active branch. How many sub-levels of the active branch may be expanded depends on the horizontal position of the pointing cursor. If this position corresponds to the top tree level, referred to as tree level 1, i.e. if the pointing cursor is placed left of the indentation of tree level 2, only the top-level element of the active branch is displayed, together with the top-level elements of the inactive branches, see FIG. 7. From the position shown in FIG. 7, the pointing cursor can be moved up and down within the viewing window without changing the tree view. Just whether or not there is an active branch and which top-level tree element is associated with the active branch changes with the vertical displacement of the pointing cursor with respect to the tree view.

When there is an active branch and the pointing cursor is moved to the right beyond the indentation of the next tree level, the next sub-level of the active branch is expanded automatically if existent. If the pointing cursor is vertically aligned with a direct super-element of the tree level being expanded, this next sub-level naturally is the sub-level of this direct super-element. Otherwise, this next sub-level is defined to be the sub-level of the topmost tree element of the lowest currently expanded tree level of the active branch. For example, if the pointing cursor is moved to the right by a distance equivalent to one level of tree indentation in the tree view shown in FIG. 7, the resulting tree view corresponds to FIG. 8 because the resulting horizontal pointing cursor position corresponds to tree level 2, i.e. the pointing cursor is placed between the indentation of tree level 2 and 3. Therefore, tree level 2 of the active branch is expanded automatically once the pointing cursor crosses the indentation of tree level 2 on its way. By moving the pointing cursor further to the right by a distance of 4 levels of tree indentation, more and more sub-levels of the active branch are expanded once the corresponding indentations are crossed, resulting in the reconfigured tree view shown in FIG. 9, with the resulting horizontal pointing cursor position intentionally corresponding to tree level 6 to illustrate that moving the pointing cursor to further indentations right of the indentation of the lowest tree level of an active branch does not cause any more changes to the tree view. Automatic expanding of sub-levels of the active branch according to the horizontal pointing cursor position also happens when the system's pointing cursor is moved into the viewing window from the left, right, or top and the entering position is vertically aligned with a tree element, which always is one of the top-level tree elements because only these are displayed when the pointing cursor does not point to the viewing window. The branch comprising the top-level tree element the pointing cursor is vertically aligned with becomes the active branch and is expanded automatically, depending on the horizontal position of the pointing cursor with respect to the tree view, restricted by the number of sub-levels of the active branch.

Typically, a user will not expand more than one sub-level of the active branch at one time but will first browse the tree elements of a recently expanded sub-level to see whether there is an element of interest and whether he wants to expand a sub-level beneath this element. For example, if a user decides to expand the sub-level beneath Concept_3_3 in the tree view shown in FIG. 8, he will probably move the pointing cursor down to Concept_3_3 to make the branch comprising Concept_3_3 the active branch, see FIG. 10, and then move the pointing cursor to the right to expand the next sub-level, see FIG. 11. If the user continues to expand the sub-level of every third element of each tree level in the tree view shown in FIG. 11, the tree view will finally correspond to FIG. 4, except for being clipped by the bottom edge of the smaller viewing window.

When there is an active branch and the pointing cursor is moved to the left crossing the indentation of the lowest currently expanded tree level except tree level 1, this tree level is collapsed automatically. If the pointing cursor is vertically aligned with a direct or indirect super-element of the tree level being collapsed, the active branch does not change. For example, if the pointing cursor is moved to the left by a distance equivalent to 4 levels of tree indentation in the tree view shown in FIG. 9, the resulting tree view corresponds to FIG. 8, because the resulting horizontal pointing cursor position corresponds to tree level 2. Therefore, tree level 5 of the of the active branch is collapsed automatically once the pointing cursor crosses the indentation of tree level 5 on its way, and tree levels 4 and 3 of the active branch are collapsed automatically once the corresponding indentations are crossed afterwards. By moving the pointing cursor further to the left by one level of tree indentation, tree level 2 of the active branch is also collapsed, resulting in the tree view shown in FIG. 7. Similarly, moving the pointing cursor to the left in the tree view shown in FIG. 11 leads to the tree view shown in FIG. 10 once the indentation of tree level 3 is crossed by the pointing cursor.

When the pointing cursor is not vertically aligned with a direct or indirect super-element of the tree level being collapsed due to moving the pointing cursor to the left, simply collapsing this tree level would cause an arbitrary tree element, if any at all, to be vertically aligned with the pointing cursor, depending on the space previously occupied by the elements of this tree level and the vertical position of the pointing cursor with respect to these elements. Therefore, there would be a new active branch comprising this arbitrary tree element or no more active branch, with no control by the user. Therefore, in the shown embodiment the updated tree view is automatically moved vertically so that the direct super-element of the tree level having been collapsed is vertically aligned with the pointing cursor in this case, with the same vertical displacement of this super-element with respect to the pointing cursor as the tree element the pointing cursor was vertically aligned with before the update of the tree view, as this position is the new logical pointing cursor position within the updated tree view. This also makes the branch comprising this super-element the active branch, enabling seamless further navigation through the tree. Another approach would be to move the pointing cursor to the position of this super-element instead, which is assumed to be confusing for the user. Furthermore, this super-element may currently not be visible, requiring moving the updated tree view anyway.

The automatic vertical moving of the updated tree view may cause the topmost element of the tree to be displayed with some distance from the top edge of the viewing window. Such displacements are quickly resolved once the user expands and scrolls through the next sub-levels of interest. For convenience, in another embodiment the mechanism includes a correction functionality moving the topmost element of the tree view to the top edge of the viewing window again, including moving the pointing cursor so that it stays at the same position with respect to the tree view. This correction functionality may be triggered on user request, e.g. by a keyboard or mouse control, or a multi-touch gesture, or automatically once such displacement would occur if configured as preferred by the user.

An example of automatic collapsing of tree levels with resulting vertical movement of the updated tree view, caused by moving the pointing cursor to the left, is illustrated by FIG. 12 to FIG. 14. FIG. 12 shows the view before the pointing cursor movement. Now the pointing cursor is moved to the left by a distance equivalent to one level of tree indentation, resulting in the tree view shown in FIG. 13 because, once the pointing cursor crosses the indentation of tree level 3 on its way, tree level 3 is collapsed automatically and the updated tree view is moved down automatically so that Concept_3_3, the direct super-element of Concept_3_3_3, is displayed at the vertical position at which Concept_3_3_3 was displayed before the update of the tree view. Further pointing cursor movement to the left by one level of tree indentation leads to the tree view shown in FIG. 14, with Concept_3 in FIG. 14 being displayed at the same vertical position as Concept_3_3 in FIG. 13.

Automatic expanding or collapsing of tree levels may also be triggered by horizontal scrolling of the viewing window if the horizontal displacement of the tree view with respect to the unchanged pointing cursor position results in the horizontal pointing cursor position corresponding to a different tree level than before, with the automatic expanding restricted by the number of sub-levels of the active branch. In principle, scrolling the viewing window to the right is restricted by the element of the tree view reaching furthest to the right being right-aligned with the right edge of the viewing window, regardless of whether this element is actually visible within the viewing window. However, as the indentation of next tree level right of the indentation of the lowest currently expanded tree level of the active branch should be accessible by the pointing cursor, by any combination of horizontal scrolling and horizontal pointing cursor movement, to enable expanding of the next sub-level of the active branch if existent, the viewing window allows to be scrolled to the right so that this indentation is clearly accessible by the pointing cursor. This results in the element of the tree view reaching furthest to the right being shown with some distance from the right edge of the viewing window if this element is actually visible and not long enough to clearly extend to this indentation. On the other hand, there are no indentations of tree levels to be accessed left of the top-level elements of the tree, so scrolling the viewing window to the left can be restricted by these top-level elements being shown at the left edge of the viewing window, including associated sub-element indicators if applied to them.

An example of automatic expanding of sub-levels of the active branch, caused by scrolling the viewing window to the right, is illustrated by FIG. 15 to FIG. 17. FIG. 15 shows the view before the scrolling. As the pointing cursor has almost reached the right edge of the viewing window, further sub-levels of the active branch cannot be expanded by moving the pointing cursor to the right, but must be expanded by scrolling the viewing window to the right instead. Furthermore, the elements of tree level 3 of the active branch are clipped by the right edge of the viewing window, so the user may also want to scroll the view to the right to be able to read more of the text of these elements. Now the viewing window is scrolled to the right by a distance equivalent to one level of tree indentation, resulting in the unchanged pointing cursor position horizontally corresponding to tree level 4, therefore tree level 4 of the active branch is expanded automatically, see FIG. 16. Be it to expand the next sub-level of the active branch or to be able to read the still clipped elements of tree level 3 of the active branch, the viewing window is now scrolled to the right by one level of tree indentation again, resulting in the unchanged pointing cursor position horizontally corresponding to tree level 5 and tree level 5 of the active branch therefore being expanded automatically, see FIG. 17. The user may now try to expand further sub-levels of the active branch by scrolling the viewing window further to the right, but as there are no such sub-levels, this will only lead to the unchanged tree view being moved to the left within the viewing window until no element of tree level 5 of the active branch is clipped by the right edge of the viewing window anymore, given that all these elements are long enough to clearly extend to the indentation of tree level 6, making further displacement of these elements with respect to the right edge of the viewing window unnecessary. If the scrolling has been performed to be able to read the text of the elements of tree level 3 of the active branch instead, the user will probably move the pointing cursor to the left next until its horizontal position corresponds to tree level 3, to automatically collapse tree levels 4 and 5 of the active branch again. When the pointing cursor is vertically aligned with a direct or indirect super-element of the tree level being collapsed due to scrolling the viewing window to the left, the active branch does not change. For example, if the viewing window shown in FIG. 17 is scrolled to the left by a distance equivalent to one level of tree indentation, the resulting tree view corresponds to FIG. 16, because the unchanged pointing cursor position horizontally corresponds to tree level 4, therefore tree level 5 of the active branch is simply collapsed automatically. By another scroll operation to the left by one level of tree indentation, tree level 4 of the active branch is also collapsed automatically, resulting in the tree view shown in FIG. 15. When the pointing cursor is not vertically aligned with a direct or indirect super-element of the tree level being collapsed due to scrolling the viewing window to the left, the updated tree view is also moved vertically so that the direct super-element of the tree level having been collapsed is vertically aligned with the unchanged pointing cursor position, similar to the behavior on moving the pointing cursor to the left under similar circumstances and for the same reasons. This may again lead to displacements of the topmost element of the tree view with respect to the top edge of the viewing window, which can be resolved as described above.

Figure 18:
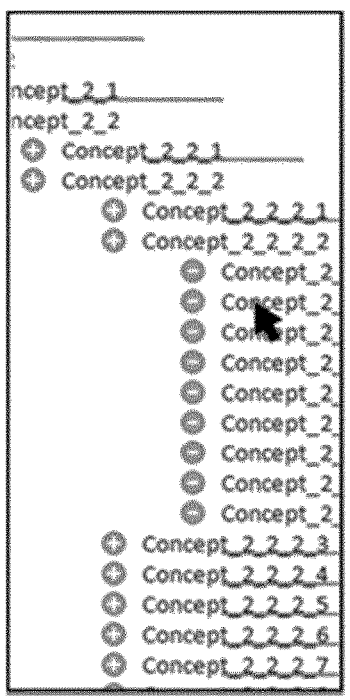
Figure 19:
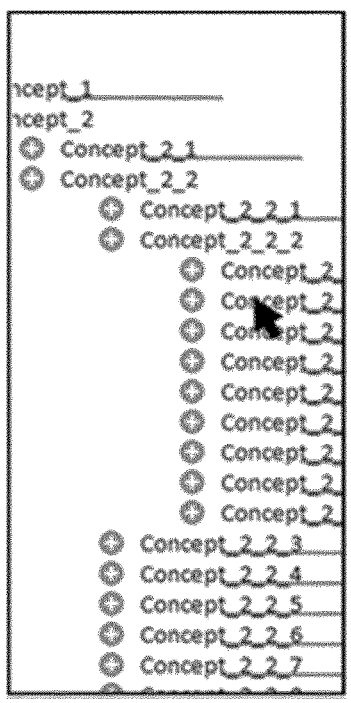
Figure 20:
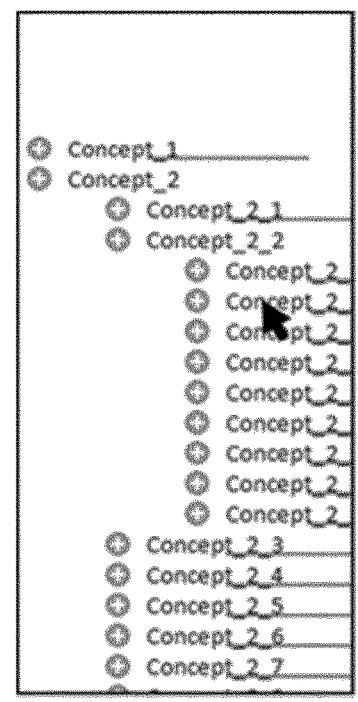

An example of automatic collapsing of tree levels with resulting vertical movement of the updated tree view, caused by scrolling the viewing window to the left, is illustrated by FIGS. 18 to 20. FIG. 18 shows the view before the scrolling. Then the viewing window is scrolled to the left by a distance equivalent to one level of tree indentation, resulting in the unchanged pointing cursor position horizontally corresponding to tree level 4, therefore tree level 5 is collapsed automatically and the updated tree view is moved down automatically so that Concept_2_2_2_2, the direct super-element of Concept_2_2_2_2_2, is displayed at the vertical position at which Concept_2_2_2_2_2 was displayed before the update of the tree view, see FIG. 19. Another scroll operation to the left by one level of tree indentation leads to the tree view shown in FIG. 20, with Concept_2_2_2 in FIG. 20 being displayed at the same vertical position as Concept_2_2_2_2 in FIG. 19.

Automatic expanding or collapsing of tree levels may also be triggered by vertical movement of the pointing cursor within the viewing window or vertical scrolling of the viewing window if the resulting vertical displacement of the pointing cursor with respect to the tree view causes an inactive branch to become the active branch or vice versa. This includes automatic collapsing of the currently active branch, if there is one, and automatic expanding of the new active branch, if there is one, the latter depending on the horizontal position of the pointing cursor with respect to the tree view, restricted by the number of sub-levels of the new active branch. As the tree views to be displayed before and after these operations may have more or less tree elements in common, the resulting update of the tree view may actually be more or less visible, up to the point that no change is visible at all. Furthermore, the proposed mechanism may automatically move the updated tree view vertically so that the actual pointing cursor position reflects the new logical pointing cursor position with respect to the updated tree view. This may again lead to displacements of the topmost element of the tree view with respect to the top edge of the viewing window, which can be resolved as described above.

Vertical scrolling of standard tree views is typically restricted by the topmost element of the tree view being shown at the top edge of the viewing window and the bottommost element of the tree view being shown at the bottom edge of the viewing window. However, this scheme does not fit well to a tree view using the proposed mechanism. First, automatic reconfigurations of the tree view on displacement of the pointing cursor with respect to the tree view will anyway often cause vertical displacements of the topmost or bottommost element of the tree view with respect to the top or bottom edge of the viewing window, respectively, so there is little use to avoid this behavior on vertical scrolling of the viewing window only. Second, vertical scrolling of the viewing window will itself often cause reconfigurations of the view, so restricting such scrolling according to the tree view being displayed before the scrolling could result in alternating scroll operations and pointing cursor movements being required to reach a tree element of interest because further scrolling could be prevented until further pointing cursor movement unlocks it again. Further, if an application using the proposed mechanism instead checked whether the updated tree view could be displayed obeying such standard scrolling restrictions and if the intended scrolling distance violated these restrictions, the scrolling distance would have to be reduced and the check would have to be performed again, possibly multiple times. Therefore, in the shown embodiment vertical scrolling according to the proposed solution is restricted by the topmost or bottommost element of the tree view being vertically aligned with the pointing cursor within the viewing window, for scrolling the viewing window up or down, respectively. This enables the user to scroll the whole tree view up or down beneath the unchanged pointing cursor position. Furthermore, the user can easily select how much of the tree view can be displayed above or below the pointing cursor by choosing a corresponding vertical pointing cursor position within the viewing window. The new logical pointing cursor position with respect to the tree view resulting from a vertical displacement of the pointing cursor with respect to the tree view caused by vertical movement of the pointing cursor within the viewing window or vertical scrolling of the viewing window, called new logical pointing cursor position, is defined by means of a conceptual tree view called tailored tree view. The tailored tree view is defined to be the actual tree view with all elements and branches expanded up to the tree level corresponding to the horizontal position of the pointing cursor, regardless of the vertical pointing cursor position, with the horizontal pointing cursor position with respect to the actual and tailored tree view being the same. The vertical pointing cursor position with respect to the actual and tailored tree view is defined as follows: When the pointing cursor is placed above the topmost element of the actual tree view, it is conceptually also placed above the topmost element of the tailored tree view, with the same vertical distance from these elements. When the pointing cursor is vertically aligned with an element of the actual tree view, it is conceptually also vertically aligned with the same element of the tailored tree view, with the same vertical displacement with respect to these elements. When the pointing cursor is placed below the bottommost element of the actual tree view, it is conceptually also placed below the bottommost element of the tailored tree view, with the same vertical distance from these elements. The new logical pointing cursor position is defined to be the position the pointing cursor would have with respect to the tailored tree view if the vertical displacement of the pointing cursor with respect to the actual tree view was applied to the tailored tree view instead, with the same direction and distance.

Figure 21:
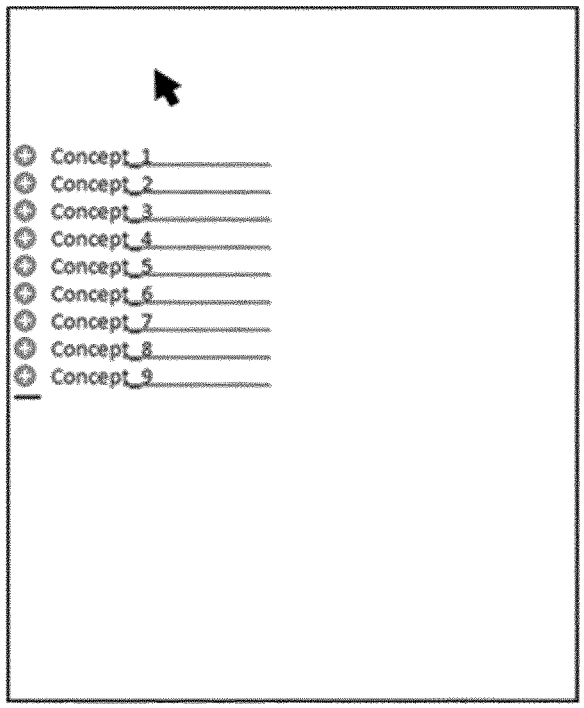
Figure 22:
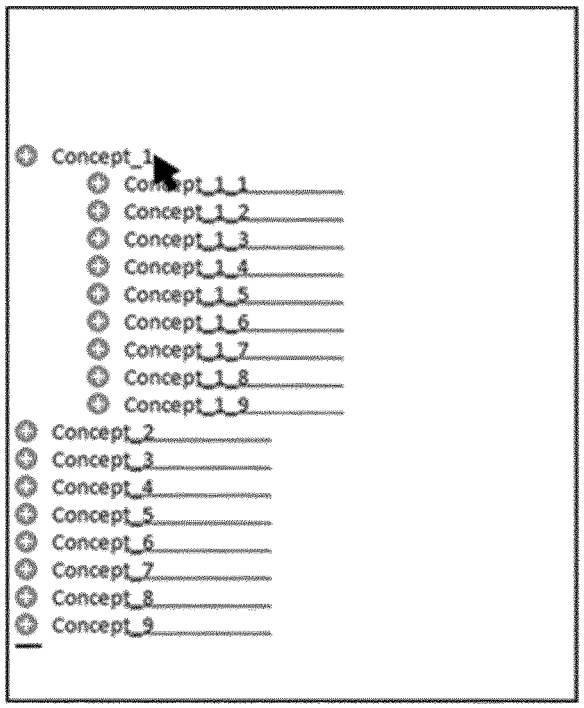

When the pointing cursor is placed within the viewing window and above the topmost element of the tree view, there is no active branch, resulting in only the top-level elements of the tree being displayed, see FIG. 21. From the position shown in FIG. 21, the pointing cursor can be moved up and down within the viewing window without changing the tree view as long as the pointing cursor stays above the topmost element of the tree view. When the pointing cursor is moved down crossing the vertical boundary between the blank area and the topmost element of the tree view, it would also cross the vertical boundary between the blank area and the topmost element of the tailored tree view. Therefore, the new logical pointing cursor position is vertically aligned with the topmost element of the tailored tree view, and the branch comprising this topmost element becomes the new active branch and is expanded automatically. As the topmost element of the tree view is always the same tree element as the topmost element of the tailored tree view, the new logical pointing cursor position matches the actual pointing cursor position, and no vertical moving of the updated tree view is needed. For example, if the pointing cursor, in the viewing window shown in FIG. 21, is moved down to the position shown in FIG. 22, the resulting tree view corresponds to FIG. 22 because, once the pointing cursor crosses the vertical boundary between the blank area and Concept_1 on its way, the new logical pointing cursor position is vertically aligned with Concept_1 and the branch comprising Concept_1 becomes the active branch and is expanded up to tree level 2 due to the horizontal pointing cursor position. When the pointing cursor is moved up within the viewing window crossing the vertical boundary between the topmost element of the tree view and a blank area above, it would also cross the vertical boundary between the topmost element of the tailored tree view and a blank area above. Therefore, the new logical pointing cursor position is just above the topmost element of the tree view, and the branch comprising this topmost element is no longer the active branch and is collapsed automatically. Due to the identity of the topmost element of the tree view and the topmost element of the tailored tree view, the new logical pointing cursor position matches the actual pointing cursor position, and no vertical moving of the updated tree view is needed. For example, if the pointing cursor, in the viewing window shown in FIG. 22, is moved up to the position shown in FIG. 21, the resulting tree view corresponds to FIG. 21, because, once the pointing cursor crosses the vertical boundary between Concept_1 and the blank area above on its way, the new logical pointing cursor position is not vertically aligned with any tree element and the branch comprising Concept_1 is no longer the active branch and is collapsed automatically.

Figure 23:
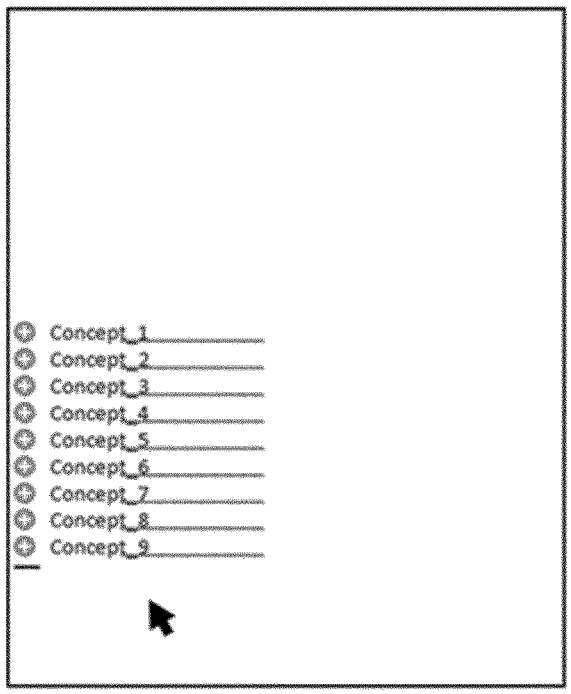
Figure 24:
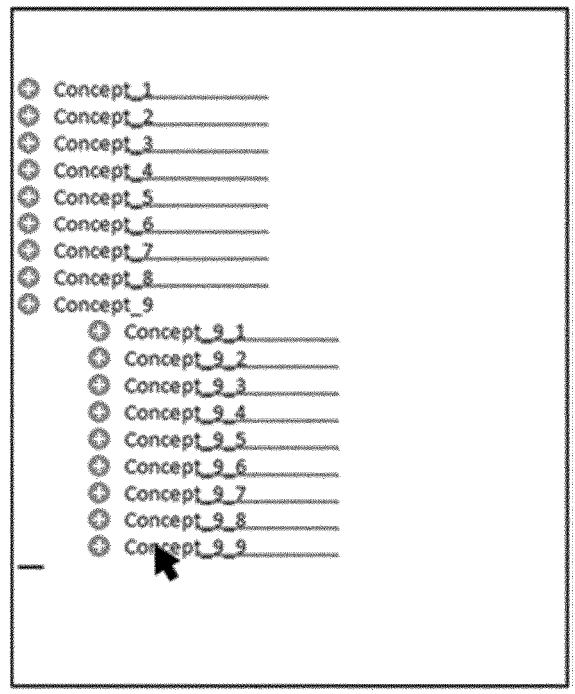

When the pointing cursor is placed within the viewing window and below the bottommost element of the tree view, there is no active branch, resulting in only the top-level elements of the tree being displayed, see FIG. 23. From the position shown in FIG. 23, the pointing cursor can be moved up and down within the viewing window without changing the tree view as long as the pointing cursor stays below the bottommost element of the tree view. When the pointing cursor is moved up crossing the vertical boundary between the blank area and the bottommost element of the tree view, it would also cross the vertical boundary between the blank area and the bottommost element of the tailored tree view. Therefore, the new logical pointing cursor position is vertically aligned with the bottommost element of the tailored tree view, and the branch comprising this bottommost element becomes the active branch and is expanded automatically. As the bottommost element of the tree view may not be the same tree element as the bottommost element of the tailored tree view, this may result in the new logical pointing cursor position not matching the actual pointing cursor position. If this is the case, the updated tree view tree view is also automatically moved vertically so that the new logical pointing cursor position and the actual pointing cursor position are the same, resulting in the bottommost element of the updated tree view being displayed at the vertical position at which the bottommost element of tree view was displayed before the update of the tree view. For example, if the pointing cursor, in the viewing window shown in FIG. 23, is moved up to the position shown in FIG. 24, the resulting tree view corresponds to FIG. 24, because, once the pointing cursor crosses the vertical boundary between the blank area and Concept_9 on its way, the new logical pointing cursor position is vertically aligned with Concept_9_9, the branch comprising Concept_9_9 becomes the active branch and is expanded up to tree level 2 due to the horizontal pointing cursor position, and the updated tree view is moved up so that Concept_9_9 is displayed at the vertical position at which Concept_9 was displayed before the update of the tree view. When the pointing cursor is moved down within the viewing window crossing the vertical boundary between the bottommost element of the tree view and a blank area below, it would also cross the vertical boundary between the bottommost element of the tailored tree view and a blank area below. Therefore, the new logical pointing cursor position is just below the bottommost element of the tree view, and the branch comprising this bottommost element is no longer the active branch and is collapsed automatically. As the bottommost element of the tree view may not be the same tree element as the bottommost element of the updated tree view, this may result in the new logical pointing cursor position not matching the actual pointing cursor position. If this is the case, the updated tree view is also automatically moved vertically so that the new logical pointing cursor position and the actual pointing cursor position are the same, resulting in the bottommost element of the updated tree view being displayed at the vertical position at which the bottommost element of tree view was displayed before the update of the tree view. For example, if the pointing cursor, in the viewing window shown in FIG. 24, is moved down to the position shown in FIG. 23, the resulting tree view corresponds to FIG. 23 because, once the pointing cursor crosses the vertical boundary between Concept_9_9 and the blank area below on its way, the new logical pointing cursor position is not vertically aligned with any tree element, the branch comprising Concept_9_9 is no longer the active branch and is collapsed automatically, and the updated tree view is moved down so that Concept_9 is displayed at the vertical position at which Concept_9_9 was displayed before the update of the tree view.

Figure 25:
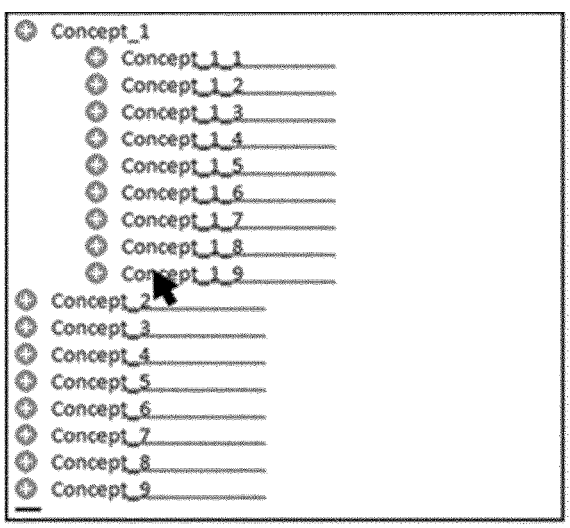
Figure 26:
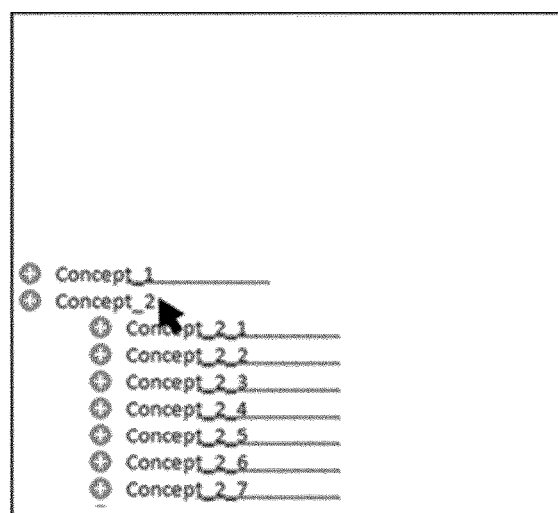

Pointing cursor movements crossing the vertical boundary between two vertically adjacent elements of the tree view result in a change of the active branch, with the currently active branch being collapsed automatically and the new active branch being expanded automatically. The new logical pointing cursor position is vertically aligned with the element of the tailored tree view directly above or below the tree element the pointing cursor was previously vertically aligned with, depending on the direction of the movement. If the update of the tree view leads to the new logical pointing cursor position not matching the actual pointing cursor position, the updated tree view is also automatically moved vertically so that the new logical pointing cursor position and the actual pointing cursor position are the same, resulting in the element of the updated tree view being vertically aligned with the pointing cursor being displayed at the vertical position at which the element of the tree view to which the pointing cursor has been moved was displayed before the update of the tree view. For example, if the pointing cursor in the viewing window shown in FIG. 25 is moved down to the position shown in FIG. 26, the resulting tree view corresponds to FIG. 26 because, once the pointing cursor crosses the vertical boundary between Concept_1_9 and Concept_2 on its way, the new logical pointing cursor position is vertically aligned with Concept_2, the branch comprising Concept_1_9 is no longer the active branch and is collapsed automatically, the branch comprising Concept_2 becomes the new active branch and is expanded up to tree level 2 due to the horizontal pointing cursor position, and the updated tree view is moved down so that Concept_2 is displayed at the same vertical position as it was displayed before the update of the tree view. If the pointing cursor, in the viewing window shown in FIG. 26, is moved up to the position shown in FIG. 25, the resulting tree view corresponds to FIG. 25 because, once the pointing cursor crosses the vertical boundary between Concept_2 and Concept_1 on its way, the new logical pointing cursor position is vertically aligned with Concept_1_9, the branch comprising Concept_2 is no longer the active branch and is collapsed automatically, the branch comprising Concept_1_9 becomes the new active branch and is expanded up to tree level 2 due to the horizontal pointing cursor position, and the updated tree view is moved up so that Concept_1_9 is displayed at the vertical position at which Concept_1 was displayed before the update of the tree view.

For consistency, automatic expanding of sub-levels of the active branch as if the pointing cursor had been moved to a new active branch from below, either from a blank area or from a currently active branch, also happens when the system's pointing cursor is moved into the viewing window from the bottom and the entering position is vertically aligned with a tree element, which is always one of the top-level tree elements, because only these are displayed when the pointing cursor does not point to the viewing window. The branch comprising the tree element the new logical pointing cursor position is vertically aligned with becomes the active branch and is expanded automatically, depending on the horizontal position of the pointing cursor with respect to the tree view, restricted by the number of sub-levels of the active branch, and the updated tree view is automatically moved vertically so that the new logical pointing cursor position matches the actual pointing cursor position.

Vertical scrolling of the viewing window is treated similar to vertical movement of the pointing cursor within the viewing window, with two notable differences: First, whereas vertical pointing cursor movement is always continuous, vertical scrolling may not be continuous, possibly resulting in the new logical pointing cursor position being vertically aligned with an arbitrary element of the tailored tree view instead of the topmost, the bottommost, or a vertically adjacent one. Second, whereas moving the pointing cursor within the viewing window above or below the tree view is unrestricted, vertical scrolling of the viewing window may be restricted as described above. In the shown embodiment, the vertical scrolling restrictions are applied. Furthermore, the following examples only illustrate vertical scrolling by distances equivalent to a multiple of the height of a tree element. Other scrolling distances would additionally lead to different vertical displacements with respect to the pointing cursor of the tree element the pointing cursor is vertically aligned with within the reconfigured tree view and the tree element the pointing cursor was vertically aligned with before the reconfiguration of the tree view, provided that the pointing cursor is vertically aligned with a tree element before and after the reconfiguration of the tree view.

Figure 27:
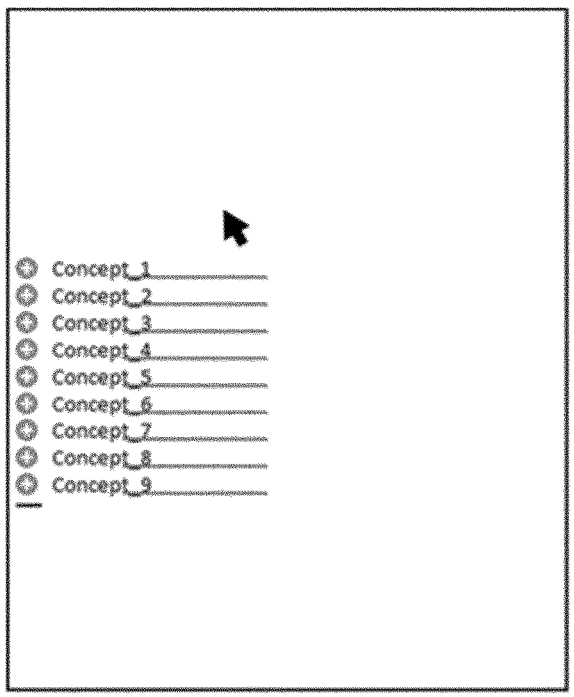
Figure 28:
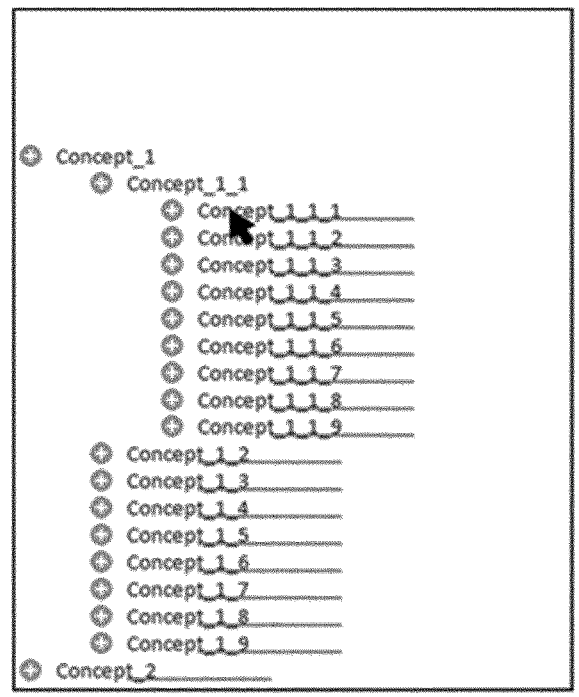

When the pointing cursor is placed within the viewing window and above the topmost element of the tree view, the viewing window can only be scrolled down, resulting in the unchanged tree view simply being moved up within the viewing window as long as the new logical pointing cursor position is not vertically aligned with any element of the tailored tree view yet. Once the new logical pointing cursor position is vertically aligned with an element of the tailored tree view for the first time, the branch comprising this element becomes the active branch and is expanded automatically. If the update of the tree view leads to the new logical pointing cursor position not matching the actual pointing cursor position, the updated tree view is also automatically moved vertically so that the new logical pointing cursor position and the actual pointing cursor position are the same. For example, if the viewing window shown in FIG. 27 is scrolled down by a distance equivalent to the height of 4 tree elements, the resulting tree view corresponds to FIG. 28 because the new logical pointing cursor position is vertically aligned with Concept_1_1_1 and the branch comprising Concept_1_1_1 becomes the active branch and is expanded up to tree level 3 due to the horizontal pointing cursor position. As the new logical pointing cursor position already matches the actual pointing cursor position, no vertical moving of the updated tree view is needed.

Figure 29:
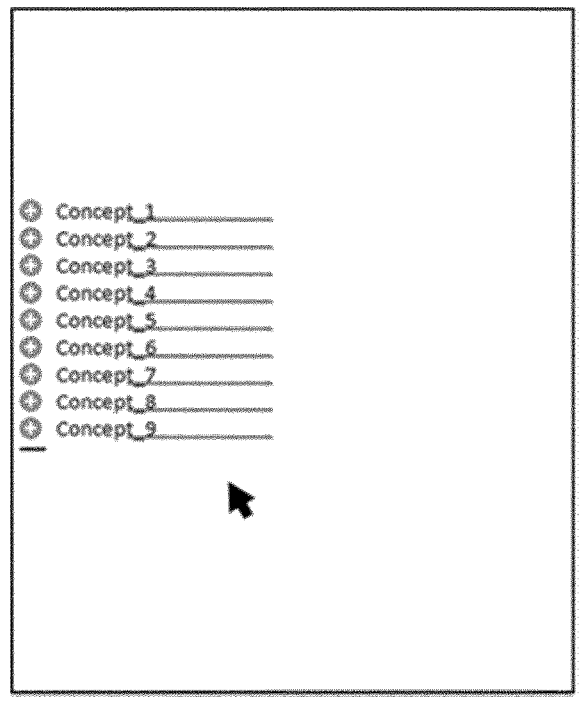
Figure 30:
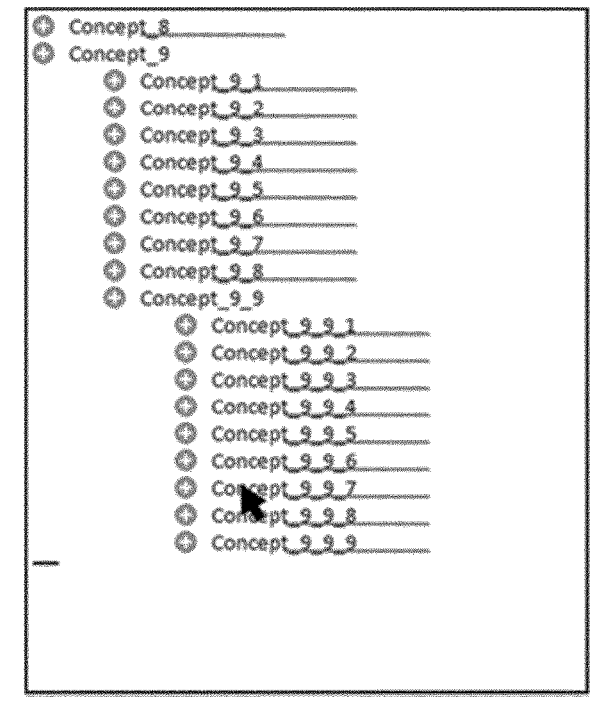

When the pointing cursor is placed within the viewing window and below the bottommost element of the tree view, the viewing window can only be scrolled up, resulting in the unchanged tree view simply being moved down within the viewing window as long as the new logical pointing cursor position is not vertically aligned with any element of the tailored tree view yet. Once the new logical pointing cursor position is vertically aligned with an element of the tailored tree view for the first time, the branch comprising this element becomes the active branch and is expanded automatically. If the update of the tree view leads to the new logical pointing cursor position not matching the actual pointing cursor position, the updated tree view is also automatically moved vertically so that the new logical pointing cursor position and the actual pointing cursor position are the same. For example, if the viewing window shown in FIG. 29 is scrolled up by a distance equivalent to the height of 4 tree elements, the resulting tree view corresponds to FIG. 30 because the new logical pointing cursor position is vertically aligned with Concept_9_9_7, the branch comprising Concept_9_9_7 becomes the active branch and is expanded up to tree level 3 due to the horizontal pointing cursor position, and the updated tree view is moved up so that the new logical pointing cursor position and the actual pointing cursor position are the same.

Figure 31:
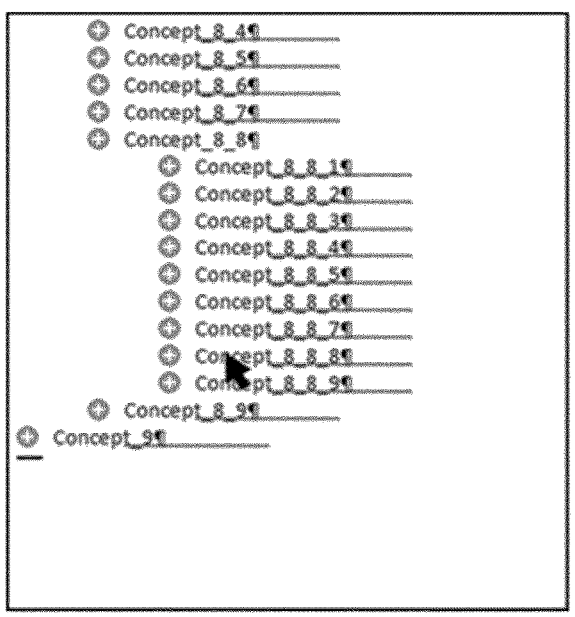
Figure 32:
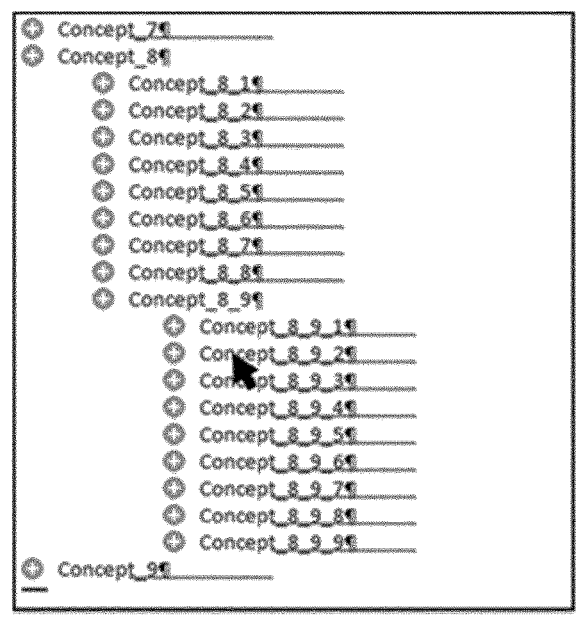

When there is an active branch and vertical scrolling of the viewing window results in the new logical pointing cursor position being vertically aligned with an element of the tailored tree view, with this tree element being different from the tree element the pointing cursor was previously vertically aligned with, the active branch changes. Therefore, the currently active branch is collapsed automatically, and the new active branch is expanded automatically. If the update of the tree view leads to the new logical pointing cursor position not matching the actual pointing cursor position, the updated tree view is also automatically moved vertically so that the new logical pointing cursor position and the actual pointing cursor position are the same. For example, if the viewing window shown in FIG. 31 is scrolled down by a distance equivalent to the height of 4 tree elements, the resulting tree view corresponds to FIG. 32 because the new logical pointing cursor position is vertically aligned with Concept_8_9_2, the branch comprising Concept_8_8_8 is no longer the active branch and is collapsed automatically, the branch comprising Concept_8_9_2 becomes the new active branch and is expanded up to tree level 3 due to the horizontal pointing cursor position, and the updated tree view is moved down so that Concept_8_9_2 is displayed at the vertical position at which Concept_8_8_8 was displayed before the update of the tree view. If the viewing window shown in FIG. 32 is scrolled up by a distance equivalent to the height of 4 tree elements, the resulting tree view corresponds to FIG. 31, because the new logical pointing cursor position is vertically aligned with Concept_8_8_8, the branch comprising Concept_8_9_2 is no longer the active branch and is collapsed automatically, the branch comprising Concept_8_8_8 becomes the new active branch and is expanded up to tree level 3 due to the horizontal pointing cursor position, and the updated tree view is moved up so that Concept_8_8_8 is displayed at the vertical position at which Concept_8_9_2 was displayed before the update of the tree view.

When scrolling the viewing window up or down would lead to a new logical pointing cursor position above the topmost element or below the bottommost element of the tree view, respectively, the scrolling restrictions take effect, reducing the scrolling distance so that the new logical pointing cursor position is vertically aligned with the topmost or bottommost element of the tailored tree view, respectively. Therefore, the currently active branch, if there is one, is collapsed automatically, and the branch comprising the topmost or bottommost element of the tailored tree view, respectively, becomes the new active branch and is expanded automatically. If the update of the tree view leads to the new logical pointing cursor position not matching the actual pointing cursor position, the updated tree view is also automatically moved vertically so that the new logical pointing cursor position and the actual pointing cursor position are the same. This is the same behavior as the behavior caused by vertical scrolling of the viewing window directly leading to the new logical pointing cursor position being vertically aligned with the topmost or bottommost element of the tailored tree view, respectively.

As will be appreciated by one skilled in the art, aspects of the present principles can be embodied as an apparatus, a system, method or computer readable medium. Accordingly, aspects of the present principles can take the form of a hardware embodiment, a software embodiment or an embodiment combining software and hardware aspects. Furthermore, aspects of the present principles can take the form of a computer readable storage medium. Any combination of one or more computer readable storage medium(s) may be utilized.

Aspects of the present principles may, for example, at least partly be implemented in a computer program comprising code portions for performing steps of the method according to an embodiment of the invention when run on a programmable apparatus or enabling a programmable apparatus to perform functions of an apparatus or system according to an embodiment of the invention.

Further, any connection shown in FIG. 2 and FIG. 3 may be a direct or an indirect connection. Furthermore, those skilled in the art will recognize that the boundaries between logic blocks are merely illustrative and that alternative embodiments may merge logic blocks or impose an alternate decomposition of functionality upon various logic blocks.

The invention claimed is:

1. A method for rendering a tree structure of elements in a graphical user interface depending on a position of a pointing cursor relative to the rendered tree structure, comprising
    generating at least a tree view of the tree structure being organized in a plurality of branches, wherein at least one of the plurality of branches includes a hierarchy of a plurality of sub-levels of the tree structure;
    determining the position of the pointing cursor relative to the tree view, the position comprising a first position value according to a first direction and a second position value according to a second direction orthogonal to the first direction, said first position value determining an active branch selected as
    the branch for which the position of the pointing cursor is aligned with according to the first direction
    and said second position value determining sub-levels of the active branch to be expanded, depending on the second position value relative to indentations in the rendering of the tree structure indicating the plurality of sub-levels so that an increasing value of the second position value determines a first sub-level deeper in the hierarchy of the plurality of sub-levels of the tree structure and a decreasing value of the second position value determines a second sub-level higher in the hierarchy of the plurality of sub-levels of the tree structure; and
    updating the tree view by expanding the determined sub-levels of the active branch and collapsing other branches when at least one of the first position value or the second position value changes.

2. The method according to claim 1, wherein the first direction corresponds to a vertical direction and the second direction corresponds to a horizontal direction on a screen of a display device displaying the tree view in the graphical user interface.

3. The method according to claim 1, wherein the steps are continuously repeated.

4. The method according to claim 1, wherein, if an amount of the sub-levels to be expanded is less than an amount of currently expanded sub-levels, the tree view is updated by collapsing an exceeding sub-level of the active branch and the updated tree view is moved in the first direction until a corresponding element hiding the collapsed exceeding sub-level becomes aligned with the position of the pointing cursor according to the first direction.

5. The method according to claim 1, wherein the tree structure of elements corresponds to a taxonomy of concepts.

6. The method according to claim 1, wherein the tree structure of elements corresponds to a directory structure of files.

7. The method according to claim 1, comprising
selecting between an automatic mode and a manual mode in response to a mode selection input by a user; wherein
the determining of the position of the pointing cursor, the selecting of the active branch, the determining of sub-levels to be expanded and the updating of the tree view are executed only in the automatic mode, and wherein
the tree view is updated in response to further manual user input to the graphical user interface in the manual mode.

8. The method according to claim 1, wherein the pointing cursor is generated specifically for user interaction with the tree view.

9. Apparatus for rendering a tree structure of elements in a graphical user interface depending on a position of a pointing cursor relative to the rendered tree structure, comprising:
at least one processor configured to
generate a tree view of the tree structure being organized in a plurality of branches, wherein at least one of the plurality of branches includes a hierarchy of a plurality of sub-levels of the tree structure;
determine the position of the pointing cursor relative to the tree view, the position comprising a first position value according to a first direction and a second position value according to a second direction orthogonal to the first direction, said first position value determining an active branch selected as
the branch for which the position of the pointing cursor is aligned with according to the first direction and
said second position value determining sub-levels of the active branch to be expanded, depending on the second position value relative to indentations in the rendering of the tree structure indicating the plurality of sub-levels so that an increasing value of the second position value determines a first sub-level deeper in the hierarchy of the plurality of sub-levels of the tree structure and a decreasing value of the second position value determines a second sub-level higher in the hierarchy of the plurality of sub-levels of the tree structure;
update the tree view by expanding the determined sub-levels of the active branch and collapsing other branches when at least one of the first position value and the second position value changes.

10. The apparatus according to claim 9, wherein the at least one processor is further configured to continuously repeat the determining of the position of the pointing cursor, and the updating of the tree view.

11. The apparatus according to claim 9, wherein the at least one processor is further configured to update the tree view by collapsing an exceeding sub-level of the active branch and to move the updated tree view in the first direction until a corresponding element hiding the collapsed exceeding sub-level becomes aligned with the position of the pointing cursor according to the first direction based on determining that an amount of the sub-levels to be expanded is less than an amount of currently expanded sub-levels.

12. The apparatus according to claim 9, wherein the at least one processor is further configured to
select between an automatic mode and a manual mode in response to a mode selection input by a user; and
only in the automatic mode execute the determining of the position of the pointing cursor using the position determination unit, including selecting the active branch, and determining sub-levels to be expanded, and execute updating the tree view, and
in the manual mode, update the tree view in response to further manual user input to the graphical user interface.

13. The apparatus according to claim 9, wherein the at least one processor is further configured to generate the pointing cursor specifically for user interaction with the tree view.

14. Apparatus comprising
at least one processor configured to:
generate a tree view of a tree structure being organized in a plurality of branches, wherein at least one of the plurality of branches includes a hierarchy of a plurality of sub-levels of the tree structure;
determine a position of a pointing cursor relative to the tree view, the position comprising a first position value according to a first direction and a second position value according to a second direction orthogonal to the first direction, said first position value determining an active branch selected as the branch for which the position of the pointing cursor is aligned with according to the first direction; and said second position value determining sub-levels of the active branch to be expanded, depending on the second position value relative to indentations in the rendering of the tree structure indicating the plurality of sub-levels so that an increasing value of the second position value determines a first sub-level deeper in the hierarchy of the plurality of sub-levels of the tree structure and a decreasing value of the second position value determines a second sub-level higher in the hierarchy of the sub-levels of the tree structure;
updating the tree view continuously and immediately in response to at least one of the first position value or the second position value changing, wherein the updating comprises expanding the determined sub-levels of the active branch and collapsing other branches.

15. A non-transitory computer readable storage medium having stored therein instructions which, when executed by a computer, cause the computer to:
determine a position of a pointing cursor relative to a tree view of a tree structure of elements in a graphical user interface, wherein the tree structure comprises a plurality of branches, and at least one of the plurality of branches includes a hierarchy of a plurality of sub-levels of the tree structure, and the position comprises a first position value according to a first direction and a second position value according to a second direction orthogonal to the first direction, said first position value determining an active branch selected as the branch for which the position of the pointing cursor is aligned with according to the first direction and said second position value determining sub-levels of the active branch to be expanded, depending on the second position value relative to indentations in the rendering of the tree structure indicating the plurality of sub-levels so that an increasing value of the second position value determines a first sub-level deeper in the hierarchy of the plurality of sub-levels of the tree structure and a decreasing value of the second position value determines a second sub-level higher in the hierarchy of the plurality of sub-levels of the tree structure;

update the tree view by expanding the determined sub-levels of the active branch and collapsing other branches when at least one of the first position value or the second position value changes.

16. The apparatus of claim 14, wherein the first direction corresponds to a vertical direction and the second direction corresponds to a horizontal direction on a screen of a display device displaying the tree view in the graphical user interface.

17. The apparatus of claim 16, wherein the at least one processor is further configured to include in the update of the tree view:

collapse of at least one branch other than the active branch;

move the updated tree view in the first direction following the collapse of the at least one other branch if the position of the pointing cursor is not aligned with the active branch.

18. A method comprising determining a position of a pointing cursor relative to a tree view of a tree structure of elements in a graphical user interface, wherein the tree structure comprises a plurality of branches, and at least one of the plurality of branches includes a hierarchy of a plurality of sub-levels of the tree structure, and the position comprises a first position value according to a first direction and a second position value according to a second direction orthogonal to the first direction, said first position value determining an active branch selected as the branch for which the position of the pointing cursor is aligned with according to the first direction and said second position value determining sub-levels of the active branch to be expanded, depending on the second position value relative to indentations in the rendering of the tree structure indicating the plurality of sub-levels so that an increasing value of the second position value determines a first sub-level deeper in the hierarchy of the plurality of sub-levels of the tree structure and a decreasing value of the second position value determines a second sub-level higher in the hierarchy of the plurality of sub-levels in the tree structure;

updating the tree view continuously and immediately in response to at least one of the first position value or the second position value changing, wherein the updating comprises expanding the determined sub-levels of the active branch and collapsing other branches.

19. The method of claim 18, wherein the first direction corresponds to a vertical direction and the second direction corresponds to a horizontal direction on a screen of a display device displaying the tree view in the graphical user interface.

20. The method of claim 19, wherein updating the tree view further comprises, following expanding the active branch:

collapsing of at least one branch other than the active branch;

moving the updated tree view in the first direction following the collapse of the at least one other branch if the position of the pointing cursor is not aligned with the active branch.

* * * * *